(12) United States Patent
Papasakellariou et al.

(10) Patent No.: US 10,742,383 B2
(45) Date of Patent: Aug. 11, 2020

(54) SYSTEM AND METHOD FOR LINK ADAPTATION FOR LOW COST USER EQUIPMENTS

(71) Applicant: Samsung Electronics Co., Ltd, Suwon-si (KR)

(72) Inventors: Aris Papasakellariou, Houston, TX (US); Eko Onggosanusi, Allen, TX (US); Boon Loong Ng, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/132,229

(22) Filed: Sep. 14, 2018

(65) Prior Publication Data

US 2019/0089512 A1 Mar. 21, 2019

Related U.S. Application Data

(63) Continuation of application No. 15/007,026, filed on Jan. 26, 2016, now Pat. No. 10,079,665.

(60) Provisional application No. 62/247,958, filed on Oct. 29, 2015, provisional application No. 62/246,844, filed on Oct. 27, 2015, provisional application No. 62/136,227, filed on Mar. 20, 2015, provisional
(Continued)

(51) Int. Cl.
| | |
|---|---|
| *H04L 12/28* | (2006.01) |
| *H04L 5/00* | (2006.01) |
| *H04B 7/0456* | (2017.01) |
| *H04L 1/00* | (2006.01) |
| *H04L 1/08* | (2006.01) |
| *H04W 4/70* | (2018.01) |

(52) U.S. Cl.
CPC ......... *H04L 5/0057* (2013.01); *H04B 7/0456* (2013.01); *H04L 1/0001* (2013.01); *H04L 1/0009* (2013.01); *H04L 1/0015* (2013.01); *H04L 1/0026* (2013.01); *H04L 1/0028* (2013.01); *H04L 1/08* (2013.01); *H04L 5/006* (2013.01); *H04L 5/0044* (2013.01); *H04W 4/70* (2018.02); *H04L 5/0007* (2013.01)

(58) Field of Classification Search
CPC ..................................................... H04L 12/50
USPC ......................................................... 370/329
See application file for complete search history.

(56) References Cited

U.S. PATENT DOCUMENTS 10,091,605 B2 10/2018 Lee
2011/0216846 A1 9/2011 Lee et al.
(Continued)

FOREIGN PATENT DOCUMENTS

| CN | 102792605 A | 11/2012 |
|---|---|---|
| CN | 103139781 A | 6/2013 |
| WO | 2014111727 A1 | 7/2014 |

OTHER PUBLICATIONS

European Patent Office, "Communication pursuant to Article 94(3) EPC," Application No. 16743730.0, dated Aug. 14, 2018, 8 pages.
(Continued)

*Primary Examiner* — Dang T Ton

(57) ABSTRACT

Methods and apparatus are provided to perform link adaptation for transmissions from a base station to a user equipment (UE) capable of receiving only in a part of a system bandwidth. Mechanisms are provided for determining and mapping a range of channel quality information (CQI) values and for measuring, deriving, and providing channel state information (CSI) reports.

18 Claims, 10 Drawing Sheets

Related U.S. Application Data application No. 62/126,136, filed on Feb. 27, 2015, provisional application No. 62/109,390, filed on Jan. 29, 2015.

(56) References Cited

U.S. PATENT DOCUMENTS

| | | |
|---|---|---|
| 2012/0008587 A1 | 1/2012 | Lee et al. |
| 2017/0005390 A1* | 1/2017 | Zakaria ................ H01Q 1/22 |

OTHER PUBLICATIONS

Samsung, "Considerations of sub-band scheduling for 1.4 MHz MTC UE," R1-150351, 3GPP TSG RAN WG1 Meeting #80, Athens, Greece, Feb. 9-13, 2015, 3 pages.

Communication pursuant to Article 94(3) EPC dated Mar. 14, 2019 in connection with European Patent Application No. 16 743 730.0, 8 pages.

LG Electronics, "Considerations on CSI reporting for low complexity UE", 3GPP TSG RAN WG1 Meeting #80, Feb. 9-13, 2015, 3 pages, R1-150204.

European Patent Office, "Communication pursuant to Article 94(3) EPC," Application No. EP16743730.0, dated Oct. 25, 2019, 6 pages.

China National Intellectual Property Administration, First Office Action regarding Application No. 201680007698.7, dated Feb. 3, 2020, 12 pages.

European Patent Office Communication pursuant to Article 94(3) EPC regarding Application No. 16743730.0, dated Jun. 4, 2020, 6 pages.

LG Electronics, "Considerations on CSI for low complexity UEs", 3GPP TSG RAN WG1 Meeting #81, R1-152706, May 2015, 6 pages.

\* cited by examiner

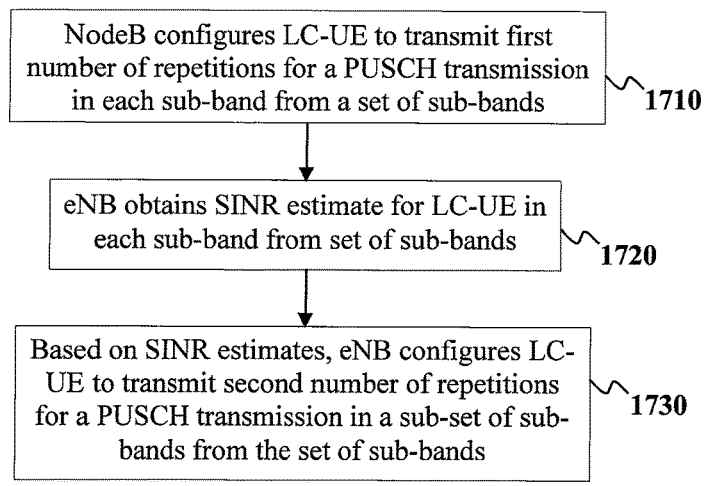
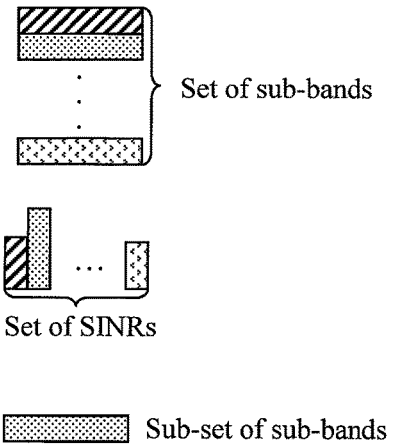
FIGURE 17A
FIGURE 17B
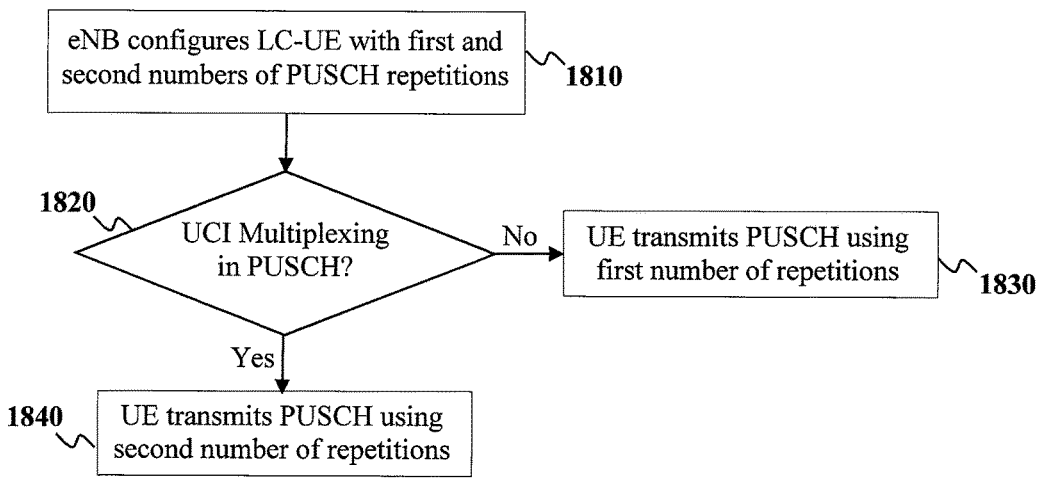
FIGURE 18

SYSTEM AND METHOD FOR LINK ADAPTATION FOR LOW COST USER EQUIPMENTS

CROSS-REFERENCE TO RELATED APPLICATION AND CLAIM OF PRIORITY

The present application is a continuation of U.S. Non-Provisional patent application Ser. No. 15/007,026 filed Jan. 26, 2016 and entitled SYSTEM AND METHOD FOR LINK ADAPTATION FOR LOW COST USER EQUIPMENTS, and claims priority to U.S. Provisional Patent Application No. 62/126,136 filed Feb. 27, 2015 and entitled "LINK ADAPTATION FOR LOW COST UES," U.S. Provisional Patent Application No. 62/247,958 filed Oct. 29, 2015 and entitled "LINK ADAPTATION FOR LOW COST UES," U.S. Provisional Patent Application No. 62/136,227 filed Mar. 20, 2015 and entitled "CHANNEL STATE INFORMATION REPORTING FOR REDUCED RATE TRANSMISSIONS," U.S. Provisional Patent Application No. 62/109,390 filed Jan. 29, 2015 and entitled "COVERAGE ENHANCEMENTS FOR CONTROL TRANSMISSIONS FROM A UE," and U.S. Provisional Patent Application No. 62/246,844 filed Oct. 27, 2015 and entitled "COVERAGE ENHANCEMENTS FOR CONTROL TRANSMISSIONS FROM A UE." The contents of the above-identified patent documents are incorporated herein by reference.

TECHNICAL FIELD

The present application relates generally to wireless communications and, more specifically, to enabling link adaptation and transmitting associated control information for communication with low cost user equipments.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to enable link adaptation and transmit associated control information for communication of a base station with user equipments.

In a first embodiment, a base station is provided. The base station includes a transmitter and a receiver. The transmitter is configured to transmit a configuration for a first set of sub-bands for transmission of physical downlink control channels (PDCCHs). A sub-band from the first set of sub-bands includes a first predetermined number of consecutive frequency resource blocks (RBs) in a downlink (DL) system bandwidth (BW) and the first predetermined number of RBs is independent of the DL system BW. The transmitter is also configured to transmit a configuration for a maximum number of repetitions for a transmission of a physical downlink data channel (PDSCH). The receiver is configured to receive a first channel state information (CSI) report. The first CSI report is computed over the first set of sub-bands for the PDCCH transmissions and is defined over the maximum number of repetitions for a PDSCH transmission.

In a second embodiment, a user equipment is provided. The user equipment includes a receiver and a transmitter. The receiver is configured to receive a configuration for a set of sub-bands for reception of a physical downlink control channels (PDCCH). A sub-band from the set of sub-bands includes a predetermined number of consecutive frequency resource blocks (RBs) in a downlink (DL) system bandwidth (BW) and the predetermined number of RBs is independent of the DL system BW. The receiver is also configured to receive a configuration for a maximum number of repetitions for a reception of a physical downlink data channel (PDSCH). The transmitter configured to transmit a channel state information (CSI) report. The CSI report is computed over the set of sub-bands for the PDCCH transmissions and is defined over the maximum number of repetitions for a PDSCH transmission.

In a third embodiment, a method is provided. The method includes transmitting, by a base station to a first user equipment (UE) a configuration for a first set of sub-bands for transmission of physical downlink control channels (PDCCHs) and a configuration for a maximum number of repetitions for a transmission of a physical downlink data channel (PDSCH). A sub-band from the first set of sub-bands includes a first predetermined number of consecutive frequency resource blocks (RBs) in a downlink (DL) system bandwidth (BW) and the first predetermined number of RBs is independent of the DL system BW. The method also includes receiving, by the base station from the first UE, a first channel state information (CSI) report. The first CSI report is computed over the first set of sub-bands for the PDCCH transmissions and is defined over the maximum number of repetitions for a PDSCH transmission.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 17A illustrates a process for an eNB to determine a sub-band to configure to a LC-UE for PUSCH transmission according to this disclosure;

FIG. 17B illustrates sub-bands associated with the process for an eNB to determine a sub-band to configure to a LC-UE for PUSCH transmission according to this disclosure;

FIG. 18 illustrates a configuration of a number of repetitions for a PUSCH transmission according to whether or not UCI is multiplexed in the PUSCH according to the disclosure.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as if fully set forth herein: 3GPP TS 36.211 v12.4.0, "E-UTRA, Physical channels and modulation" (REF 1); 3GPP TS 36.212 v12.3.0, "E-UTRA, Multiplexing and Channel coding" (REF 2); 3GPP TS 36.213 v12.4.0, "E-UTRA, Physical Layer Procedures" (REF 3); 3GPP TS 36.321 v12.4.0, "E-UTRA, Medium Access Control (MAC) protocol specification" (REF 4); and 3GPP TS 36.331 v12.4.0, "E-UTRA, Radio Resource Control (RRC) Protocol Specification" (REF 5).

This disclosure relates to link adaptation and transmission of associated control signaling for low cost user equipments (UEs). A wireless communication network includes a downlink (DL) that conveys signals from transmission points, such as base stations or enhanced NodeBs (eNBs), to UEs. The wireless communication network also includes an uplink (UL) that conveys signals from UEs to reception points, such as eNBs.

Figure 1:
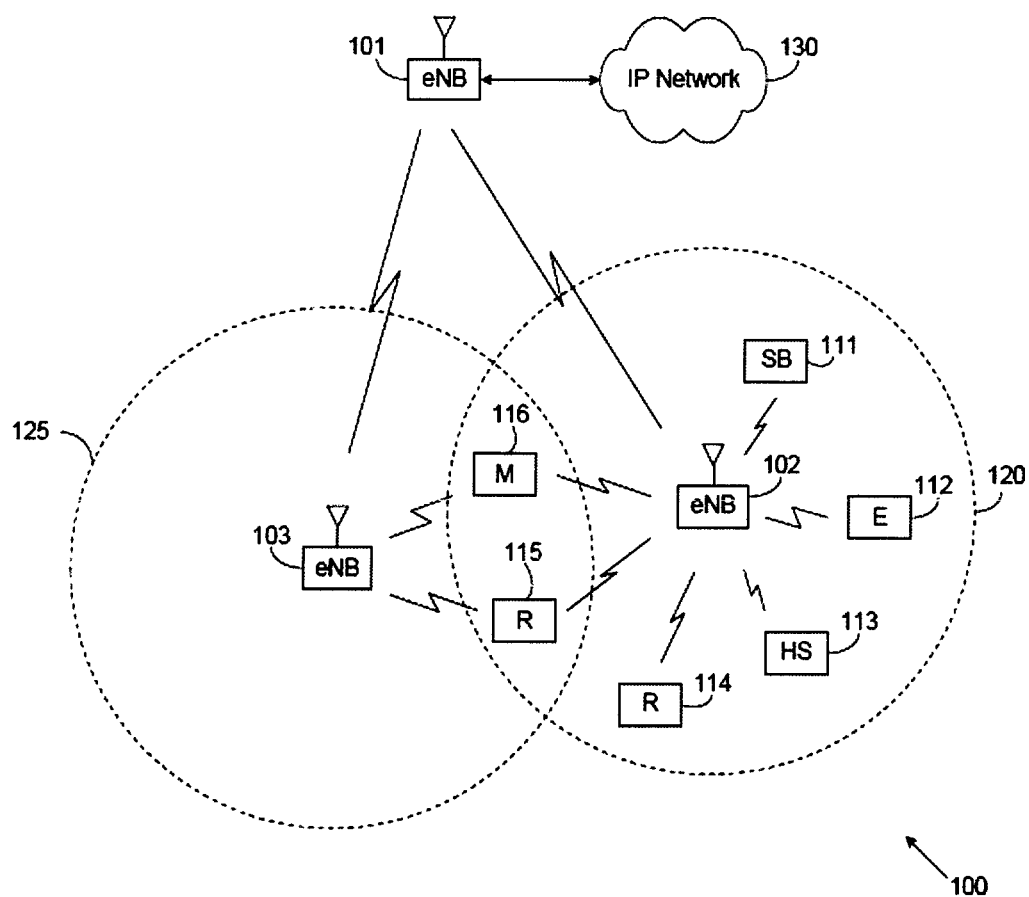
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms can be used instead of "NodeB" or "eNB," such as "base station" or "access point." For the sake of convenience, the terms "NodeB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." A UE, can be fixed or mobile and can be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, various components of the network 100, such as the eNBs 101-103, support the adaptation of communication direction in the network 100, and can provide link adaptation for communication with one or more of UEs 111-116. In addition, one or more of UEs 111-116 are configured to support the adaptation of communication direction in the network 100 for providing link adaptation for communication between one or more of eNBs 101-103 with one or more of UEs 111-116.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
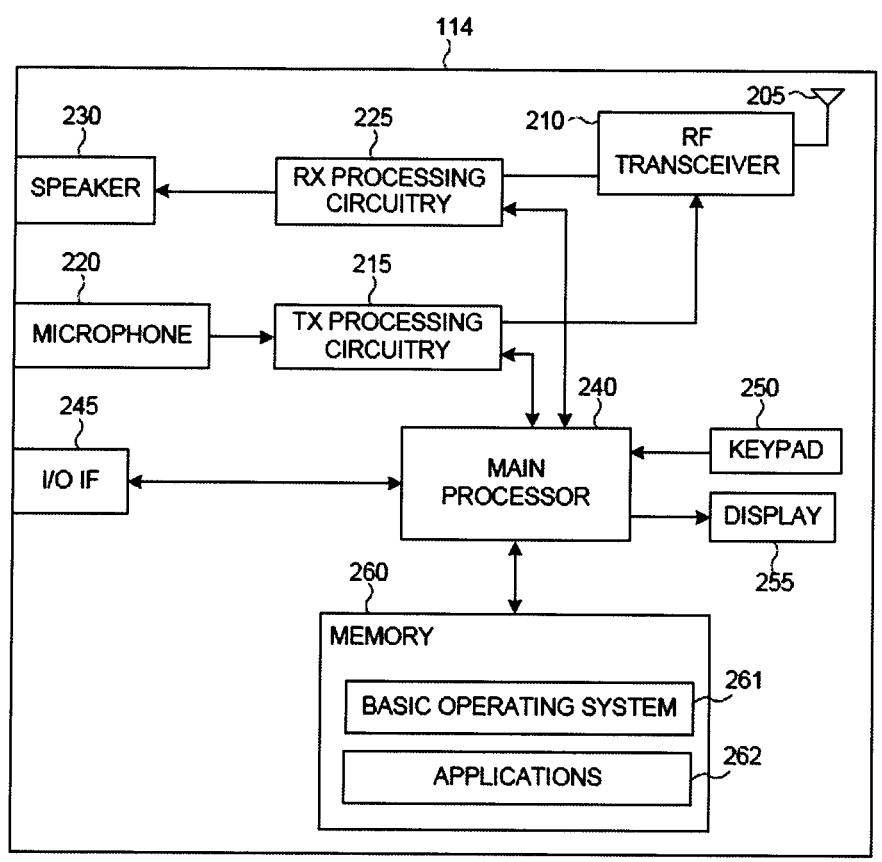
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 can be a liquid crystal display or other display capable of rendering text and/or at least limited graphics, such as from web sites. The display 255 could also represent a touch-screen.

The memory 260 is coupled to the main processor 240. Part of the memory 260 could include a broadcast signaling memory (RAM), and another part of the memory 260 could include a Flash memory or other read-only memory (ROM).

As described in more detail below, the transmit and receive paths of the UE 114 support link adaptation and transmission of associated control signaling in a normal mode or in an enhanced coverage mode. In certain embodiments, the TX processing circuitry 215 and RX processing circuitry 225 include processing circuitry configured to support link adaptation and transmission of associated control signaling in a normal mode or in an enhanced coverage mode. In certain embodiments, the main processor 240 is configured to control the RF transceivers 210, the TX processing circuitry 215, or the RX processing circuitry 225, or a combination thereof, to support link adaptation and transmission of associated control signaling in a normal mode or in an enhanced coverage mode.

Although FIG. 2 illustrates one example of UE 114, various changes can be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
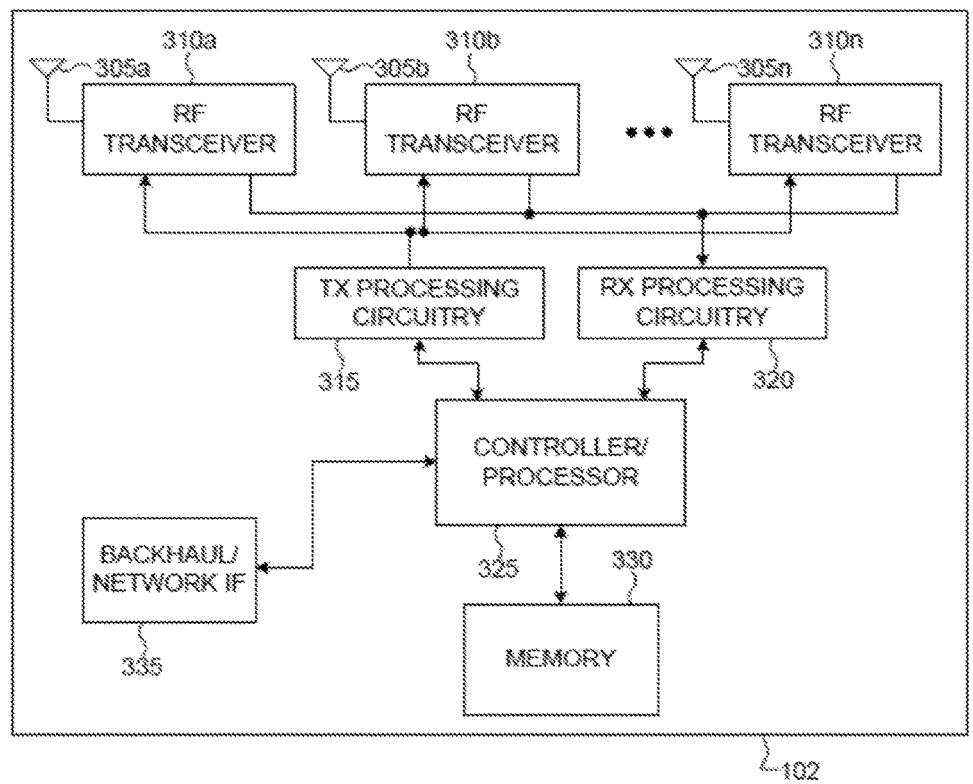
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 support link adaptation and transmission of associated control signaling in a normal mode or in an enhanced coverage mode. In certain embodiments, the TX processing circuitry 315 and RX processing circuitry 320 include processing circuitry configured to support link adaptation and transmission of associated control signaling in a normal mode or in an enhanced coverage mode. In certain embodiments, the main processor 240 is configured to control the RF transceivers 310a-310n, TX processing circuitry 315 or RX processing circuitry 320, or a combination thereof, to support link adaptation and transmission of associated control signaling in a normal mode or in an enhanced coverage mode.

Although FIG. 3 illustrates one example of an eNB 102, various changes can be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

Machine type communications (MTC) or Internet of Things (IoT) refers to communication of automated devices in a network. Compared to typical human communication, MTC typically has relaxed latency and Quality of Service (QoS) requirements and often does not require mobility support. However, MTC also requires that respective UEs have reduced cost and reduced power consumption compared to UEs serving human communications.

MTC UEs can be used for a wide variety of applications in different sectors including healthcare, such as monitors, industrial, such as safety and security, energy, such as meters and turbines, transport, such as fleet management and tolls, and consumer and home, such as appliances and power systems.

The requirements of reduced power consumption or reduced cost for MTC UEs that can be realized by limiting the power amplifier gain or reducing the number of receiver antennas can lead to reduced coverage for MTC UEs relative to conventional UEs. The coverage for MTC UEs can be further degraded by the location of MTC UEs that is often in basements of building or, in general, in locations where propagation of radio signals experiences substantial path-loss. For these reasons, supporting coverage enhancements is an essential feature for a MTC system.

A transmission time interval (TTI) for DL signaling or UL signaling is referred to as a subframe (SF) and includes two slots. A unit of ten SFs is referred to as a frame. A bandwidth (BW) unit is referred to as a resource block (RB), one RB over one slot is referred to as a physical RB (PRB) and one RB over one SF is referred to as a PRB pair.

In some wireless networks, DL signals include data signals conveying information content, control signals conveying DL control information (DCI), and reference signals (RS) that are also known as pilot signals. The eNB 102 transmits data information through respective physical DL shared channels (PDSCHs). The eNB 102 also transmits DCI through respective physical DL control channels (PDCCHs). The eNB 102 can transmit one or more of multiple types of RS including a UE-common RS (CRS), a channel state information RS (CSI-RS), and a demodulation RS (DMRS)—see also REF 1. The eNB 102 transmits a CRS over a DL system BW and the CRS can be used by UEs to demodulate data or control signals or to perform measurements. To reduce CRS overhead, the eNB 102 can transmit a CSI-RS with a smaller density in the time and/or frequency domain than a CRS. UE 114 can determine CSI-RS transmission parameters, when applicable, through higher layer signaling from eNB 102. DMRS is transmitted only in the BW of a respective PDSCH or PDCCH and UE 114 can use the DMRS to demodulate information in the PDSCH or the PDCCH. DL signals also include transmission of a logical channel that carries system control information is referred to as broadcast control channel (BCCH). A BCCH is mapped to either a transport channel referred to as a broadcast channel (BCH) or to a DL shared channel (DL-SCH). Most UE-common system information (SI) is included in different SI blocks (SIBs) that are transmitted using DL-SCH.

In some wireless networks, UL signals include data signals conveying data information, control signals conveying UL control information (UCI), and UL RS. UE 114 transmits data information or UCI through a respective physical UL shared channel (PUSCH) or a physical UL control channel (PUCCH). When UE 114 needs to transmit data information and UCI in a same SF, UE 114 can multiplex both in a PUSCH. The UCI includes HARQ acknowledgement (HARQ-ACK) information indicating correct (ACK) or incorrect (NACK) detection for data transport block (TB) in a PDSCH, or absence of a PDCCH detection (DTX), scheduling request (SR) indicating whether UE 114 has data in its buffer, and rank indicator (RI) and channel state information (CSI) enabling eNB 102 to select appropriate parameters for PDSCH transmissions to UE 114. The HARQ-ACK information is also transmitted by UE 114 in response to a detection of a PDCCH indicating a release of semi-persistently scheduled (SPS) PDSCH (see also REF 3). For brevity, this is not explicitly mentioned in the following descriptions. In addition to the CSI, a UE can provide to a serving NodeB a Reference Signal Received Power (RSRP) information through a Medium Access Control (MAC) element in a PUSCH transmission.

CSI transmission can be periodic (P-CSI) in a PUCCH with parameters configured to UE 114 from eNB 102 by higher layer signaling, such as for example radio resource control (RRC) signaling, or aperiodic (A-CSI) in a PUSCH as triggered by an A-CSI request information element (IE) included in a DCI format scheduling a PUSCH (UL DCI format—see also REF 2). CSI includes Channel Quality Information (CQI) and Precoding Matrix Indicator (PMI). The CQI informs eNB 102 of a modulation and coding scheme (MCS) for a transmission of a data TB so that UE 114 can detect the data TB with a block error rate (BLER) that is below a predetermined value, such as 10%. The PMI informs eNB 102 of a precoding weight to apply to a PDSCH transmission from multiple antennas. The CQI can be wideband CQI over the entire DL system BW or sub-band CQI over a predetermined number of RBs for a DL system BW.

A UE selected sub-band CSI report divides a DL system BW into multiple sub-bands, each including a number of consecutive RBs that depends on the DL system BW, selects a set of preferred sub-bands (the best M sub-bands in REF 3), then reports one CQI value for the wideband and one differential CQI value for the set of sub-bands where "sub-band differential CQI offset level=sub-band CQI index−wideband CQI index" (see also TABLE 0 from REF 3). A sub-band size depends on the DL system BW and is, for example, 4 RBs, 6 RBs, and 8 RBs for DL system BWs of 25 RBs, 50 RBs, and 100 RBs, respectively (see also REF 3).

TABLE 0

Mapping differential CQI value to offset level

| Differential CQI value | Offset level |
|---|---|
| 0 | ≤1 |
| 1 | 2 |
| 2 | 3 |
| 3 | ≥4 |

The higher layer configured sub-band report provides the highest granularity. The sub-band report divides the entire system BW into multiple sub-bands, then reports one wideband CQI value and multiple differential CQI values, one for each sub-band. For P-CSI and A-CSI, a number of different reporting modes exist that also depend on the PDSCH transmission mode that is configured to the UE (see also REF 3). For CSI reporting in an UL SF n, a CSI reference resource is defined by a single DL SF $n-n_{CQI\_ref}$ (see also REF 3 for a definition of $n_{CQI\_ref}$).

UL RS includes DMRS and sounding RS (SRS).

The UE 114 transmits DMRS only in a BW of a respective PUSCH or PUCCH. The eNB 102 can use a DMRS to demodulate data signals or UCI signals. A DMRS is transmitted using a Zadoff-Chu (ZC) sequence having a cyclic shift (CS) and an orthogonal covering code (OCC) that eNB 102 can inform to UE 114 through a respective UL DCI format (see also REF 2) or configure by higher layer signaling. UE 114 transmits SRS to provide eNB 102 with an UL CSI. The SRS transmission can be periodic (P-SRS) at predetermined SFs with parameters configured to UE 114 from eNB 102 by higher layer signaling or the SRS transmission can be aperiodic (A-SRS) as triggered by a DCI format scheduling PUSCH or PDSCH (DL DCI format) (see also REF 2 and REF 3).

Data information is transmitted with an MCS identified by a modulation order $Q'_m$ ($Q'_m=2$ for QPSK, $Q'_m=4$ for QAM16, and $Q'_m=6$ for QAM64) and a coding rate, for example, for a turbo code. Based on the MCS and the RB assignment, UE 114 can determine a TB size (TBS) for a data TB. Retransmissions of a data TB, either in a PDSCH or in a PUSCH, can be by using incremental redundancy (IR) identified by a redundancy version (RV). When all retransmissions of a data TB are with a same RV as used for the initial transmission of the data TB (RV0), chase combining (CC) applies. A new data indicator (NDI) IE in a DCI format indicates whether a respective PDSCH or PUSCH conveys a transmission of a new data TB or a retransmission of a previous data TB (see also REF 2). A PDSCH or a PUSCH transmission can be distributed in a BW by using frequency hopping (FH) or can be localized in a BW without using FH. An associated DCI format provides a respective indication.

Figure 4:
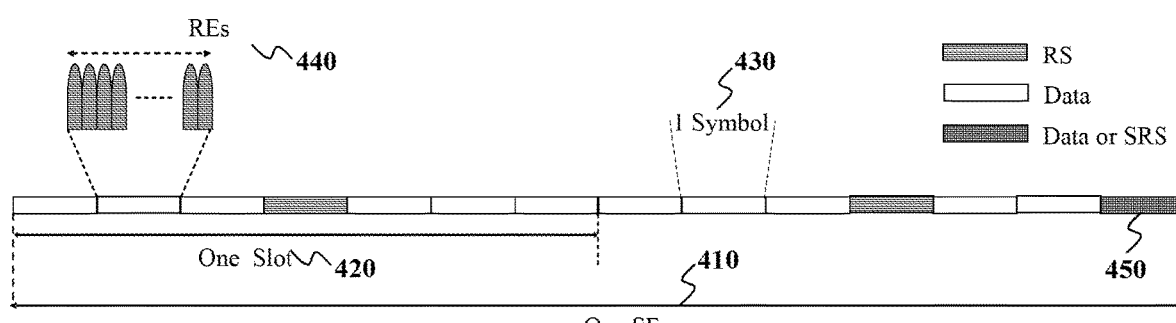
FIG. 4 illustrates an example UL SF structure for PUSCH transmission or PUCCH transmission according to this disclosure.

FIG. 4 illustrates an example UL SF structure for PUSCH transmission or PUCCH transmission according to this disclosure. The embodiment of the UL SF structure shown in FIG. 4 is for illustration only. Other embodiments could be used without departing from the scope of the present disclosure.

In the example shown in FIG. 4, an UL SF 410 includes two slots 420. Each slot 420 includes $N_{symb}^{UL}$ symbols 430 for transmitting data information, UCI, DMRS, or SRS. Each RB includes $N_{sc}^{RB}$ resource elements (REs). UE 114 is allocated $N_{RB}$ RBs 440 for a total of $N_{RB} \cdot N_{sc}^{RB}$ REs for a transmission BW. For a PUCCH, $N_{RB}=1$. A last SF symbol can be used to multiplex SRS transmissions 450 from one or more UEs. A number of SF symbols that are available for data/UCI/DMRS transmission is $N_{symb}=2 \cdot (N_{symb}^{UL}-1)-N_{SRS}$, where $N_{SRS}=1$ when a last SF symbol is used to transmit SRS and $N_{SRS}=0$ otherwise.

Figure 5:
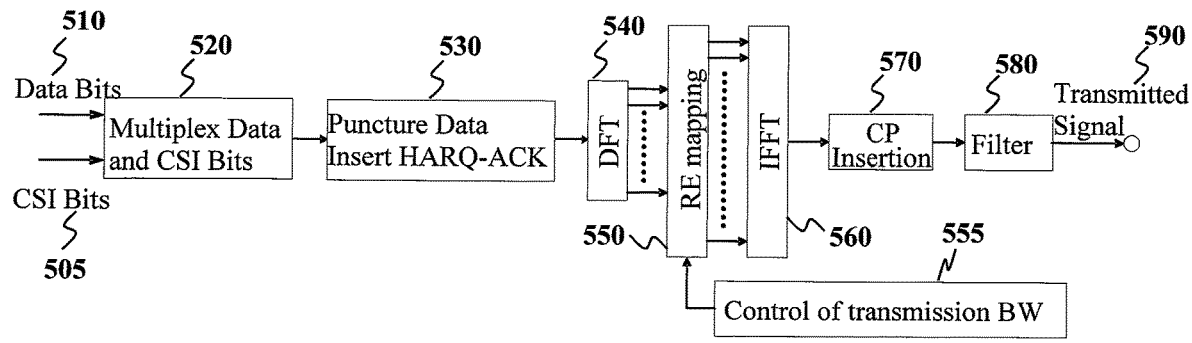
FIG. 5 illustrates a transmitter block diagram for UCI and data information in a PUSCH in a SF according to this disclosure.

FIG. 5 illustrates a transmitter block diagram for UCI and data information in a PUSCH in a SF according to this disclosure. The embodiment of the transmitter block diagram shown in FIG. 5 is for illustration only. Other embodiments could be used without departing from the scope of the present disclosure.

Coded CSI bits (CQI bits and/or PMI bits) 505 and coded data bits 510 are multiplexed by multiplexing unit 520. When HARQ-ACK bits are also multiplexed, data bits are punctured by puncturing unit 530 to accommodate HARQ-ACK bits. The Discrete Fourier Transform (DFT) unit 540 applies a DFT on the combined data bits and UCI bits, a transmission BW selection unit 555 selects REs 550 corresponding to an assigned transmission BW, filter 560 applies an Inverse Fast Fourier Transform (IFFT), unit 570 inserts a Cyclic Prefix (CP), filtering is applied by filter 580, and a signal transmitted 590. An encoding process for data bits and UCI bits as well as a modulation process for all transmitted bits are omitted for brevity.

Figure 6:
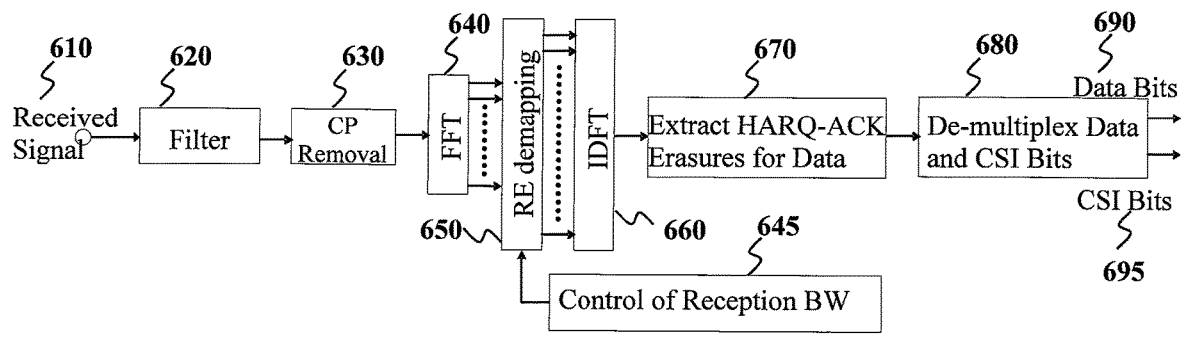
FIG. 6 illustrates a receiver block diagram for UCI and data information in a PUSCH in a SF according to this disclosure.

FIG. 6 illustrates a receiver block diagram for UCI and data information in a PUSCH in a SF according to this disclosure. The embodiment of the receiver block diagram shown in FIG. 6 is for illustration only. Other embodiments could be used without departing from the scope of the present disclosure.

After an antenna receives a radio-frequency analog signal and after further processing units (such as filters, amplifiers, frequency down-converters, and analog-to-digital converters—not shown for brevity), a digital signal 610 is filtered by filter 620 and a CP is removed by unit 630. Subsequently, filter 640 applies a Fast Fourier Transform (FFT), a reception BW selector 645 selects REs 650 used by the transmitter, filter 660 applies an Inverse DFT (IDFT), HARQ-ACK bits are extracted and respective erasures for data bits are placed by unit 670, and a de-multiplexer unit 680 de-multiplexes data bits 690 and CSI bits 695.

Figure 7:
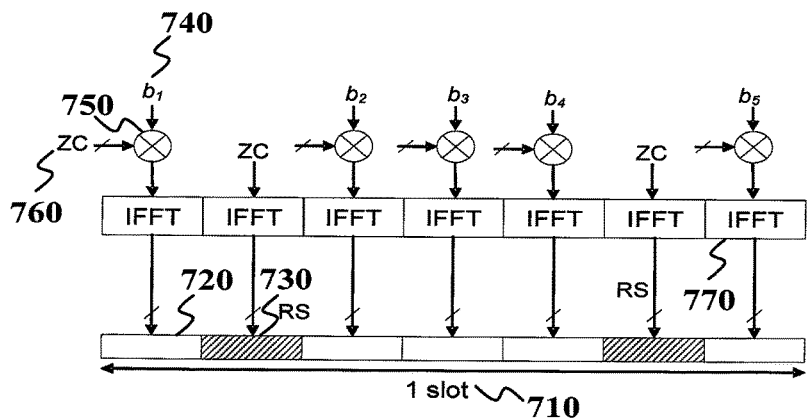
FIG. 7 illustrates a PUCCH structure for transmitting CSI in one slot of a SF that includes two slots according to this disclosure.

FIG. 7 illustrates a PUCCH structure for transmitting CSI in one slot of a SF that includes two slots according to this disclosure. The embodiment of the PUCCH structure shown in FIG. 7 is for illustration only. Other embodiments could be used without departing from the scope of the present disclosure.

In certain embodiments, the CSI is transmitted in a SF that includes two slots 710. Each slot 710 includes $N_{symb}^{UL}$ symbols for transmitting CSI 720 or RS 730 in a RB. Encoded CSI bits 740 modulate 750 a Zadoff-Chu (ZC) sequence 760 using Quaternary Phase Shift Keying (QPSK) modulation. A modulated ZC sequence is transmitted after performing an IFFT 770. A RS is transmitted through an unmodulated ZC sequence. For an information payload of $O_{CSI}$ bits, the encoded bits are the output of a $(20, O_{CSI})$ Reed-Muller (RM) code.

Figure 8:
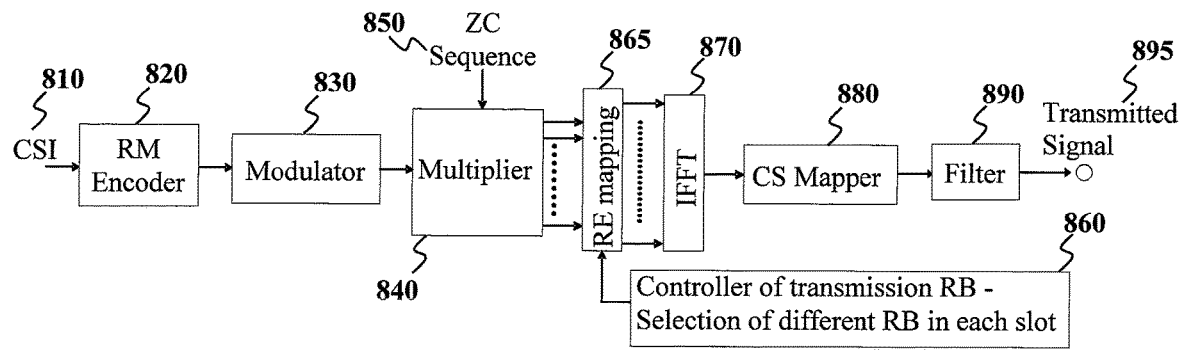
FIG. 8 illustrates a transmitter block diagram for CSI in a PUCCH according to this disclosure.

FIG. 8 illustrates a transmitter block diagram for CSI in a PUCCH according to this disclosure. The embodiment of the transmitter block diagram shown in FIG. 8 is for illustration only. Other embodiments could be used without departing from the scope of the present disclosure.

CSI information bits 810 are encoded by a RM encoder 820, modulated by modulator 830, and modulate 840 a ZC sequence 850 that is generated in the frequency-domain. A first RB and a second RB are selected by selector 860 for mapping 865 of the ZC sequence in a first slot and in a second slot, respectively, IFFT filer 870 performs an IFFT, and a Cyclic Shift (CS), as it is subsequently described, is applied to the IFFT output 880 that is then filtered by filer 890 and transmitted 895.

Figure 9:
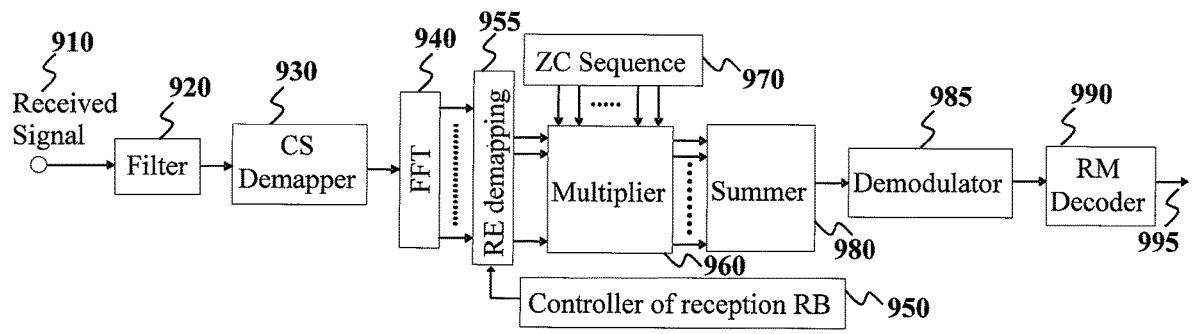
FIG. 9 illustrates a receiver block diagram for CSI in a PUCCH according to this disclosure.

FIG. 9 illustrates a receiver block diagram for CSI in a PUCCH according to this disclosure. The embodiment of the receiver block diagram shown in FIG. 9 is for illustration only. Other embodiments could be used without departing from the scope of the present disclosure.

A received signal 910 is filtered by filter 920, a CS is restored by unit 930, a FFT is applied by filter 940, a selector 950 selects a first RB and a second RB 955 in a first slot and in a second slot, respectively, and a resulting signal is correlated by multiplier 960 with a replica 970 of a ZC sequence, summed by summer 980 over the REs of the RB, the output is demodulated by demodulator 985, the demodulated bits are decoded by RM decoder 990 that provides the decoded CSI 995.

A UE computes a wideband CQI based on an unrestricted observation interval in time and frequency and derives for each CQI value a CQI index between 1 and 15 corresponding to a modulation scheme and TB size that the UE can receive with BLER not exceeding 10%. When this is not possible, the UE reports a CQI index of 0. An interpretation of the CQI indices is given in TABLE 1.

TABLE 1

4-bit CQI Table for UEs with two receiver antennas

| CQI Bits | CQI index | Modulation | code rate × 1024 | Efficiency |
|---|---|---|---|---|
| 0000 | 0 | | out of range | |
| 0001 | 1 | QPSK | 78 | 0.1523 |
| 0010 | 2 | QPSK | 120 | 0.2344 |
| 0011 | 3 | QPSK | 193 | 0.3770 |
| 0100 | 4 | QPSK | 308 | 0.6016 |
| 0101 | 5 | QPSK | 449 | 0.8770 |
| 0110 | 6 | QPSK | 602 | 1.1758 |
| 0111 | 7 | 16QAM | 378 | 1.4766 |
| 1000 | 8 | 16QAM | 490 | 1.9141 |
| 1001 | 9 | 16QAM | 616 | 2.4063 |
| 1010 | 10 | 64QAM | 466 | 2.7305 |
| 1011 | 11 | 64QAM | 567 | 3.3223 |
| 1100 | 12 | 64QAM | 666 | 3.9023 |
| 1101 | 13 | 64QAM | 772 | 4.5234 |
| 1110 | 14 | 64QAM | 873 | 5.1152 |
| 1111 | 15 | 64QAM | 948 | 5.5547 |

MTC through cellular networks is emerging as a significant opportunity for new applications in a networked world where devices communicate with humans and with each other. An important requirement for commercial success of MTC is for respective UEs to have much lower cost than conventional UEs and low power consumption. Cost reduction for low cost UEs (LC-UEs) can be obtained both from the radio frequency (RF) operation and from the digital baseband (DBB) operation. This can be realized by reducing a transmission BW and a reception BW, or reducing the number of UE receiver antennas. Reduction of a reception BW can lead to reduced frequency diversity and a single LC-UE receiver antenna can lead both to reduced received signal power and absence of receiver antenna diversity. The combined effect of such operating conditions can be a degraded reception reliability of signaling and a reduced coverage for LC-UEs relative to UEs that do not have the aforementioned limitations associated with cost reductions. As a consequence, 64 Quadrature Amplitude Modulation (64 QAM) is not supported for LC-UEs and respective entries in TABLE 1 are not applicable for LC-UEs.

Coverage can be further degraded by the location of LC-UEs that can often be in basements of building or, in general, in locations where propagation of radio signals experiences substantial path-loss. For these reasons, supporting coverage enhancements (CE) is an essential feature for a communication system supporting LC-UEs. In extreme coverage scenarios, LC-UEs may have characteristics such as very low data rate, greater delay tolerance, and limited mobility, thereby potentially being capable to operate without some messages/channels. Not all LC-UEs require CE or require a same amount of CE. In addition, in different deployment scenarios, a required CE level can be different for different eNBs, for example depending on a eNB transmission power or an associated cell size, as well as for different LC-UEs, for example depending on a location of a LC-UE.

CE is typically supported by repeating transmissions of signals either in a time domain or in a frequency domain. A LC-UE operating with CE can be configured by a serving eNB with a CE level corresponding to a number of SFs for a transmission or reception of a respective channel. For example, when UE 114 is an LC-UE, LC-UE 114 can be configured by eNB 102 with a first number of SFs to receive repetitions of a PDSCH, a second number of SFs to transmit repetitions of a PUSCH, and so on. In order to minimize the number of SFs that LC-UE 114 needs to receive a PDSCH or a control channel, respective transmissions can be over all RBs where LC-UE 114 can receive in a SF, such as six contiguous RBs, referred to as a sub-band and also known as a narrow-band, as eNB 102 is assumed to not be power limited. Conversely, since LC-UE 114 is configured to transmit an UL channel with repetitions already transmits with a maximum power, and in order to maximize the power spectral density, LC-UE 114 can transmit in 1 RB in a SF, or in even smaller BW that 1 RB when supported.

As transmissions of physical channels with repetitions consume additional resources and consequently result to lower spectral efficiency and larger power consumption for LC-UE 114, it is beneficial to enable link adaptation providing proper adjustments for the number of SFs used for repetitions of a DL channel or of an UL channel transmission. Link adaptation is also beneficial for non-CE operation in order to maximize spectral efficiency and minimize a number of SFs for transmission of control channels or data channels. Link adaptation for DL channel transmissions to LC-UE 114 can be enabled through CSI feedback from LC-UE 114. Link adaptation can apply to both a PDSCH transmission and to a DL control channel transmission to LC-UE 114. The control channel will be referred to as M-PDCCH. For example, an M-PDCCH can be based on the transmission structure of an EPDCCH (see also REF 1 and REF5). Link adaptation for UL channel transmissions from LC-UE 114 can be enabled through a RS (DMRS or SRS) transmission in the BW of the UL channel transmissions. For a TDD system, information for UL link adaptation can also be used for DL link adaptation and the reverse. Therefore, it is beneficial to design CSI feedback mechanisms and DMRS or SRS transmission from LC-UEs that enable proper link adaptation while considering the reception characteristics of LC-UEs of a reduced reception BW and on a single receiver antenna and the transmission characteristics of LC-UEs of a reduced transmission BW.

When LC-UE 114 is configured by RRC signaling a number of repetitions of a P-CSI transmission in a PUCCH or indicated by a DCI format a number of repetitions for A-CSI in a PUSCH, the repetitions can at least partially overlap with one or more repetitions of a PUCCH transmission conveying HARQ-ACK information or SR or with one or more repetitions of a PUSCH transmission (in case of P-CSI). Multiplexing rules for P-CSI transmission with transmission of other types of UL information or, in general, multiplexing rules between types of UL control or data information need to be defined when one or more repetitions for a transmission of a first information type at least partially overlap with one or more repetitions of a second information type.

Certain embodiments of this disclosure provide analysis to define a CQI table for LC-UEs. Certain embodiments of this disclosure also provide mechanisms to enable link adaptation for M-PDCCH transmissions or for PDSCH transmissions from an eNB to a LC-UE by the LC-UE determining and reporting wideband CQI and sub-band CQI. Additionally, certain embodiments of this disclosure provide mechanisms to enable link adaptation for PUSCH transmissions from a LC-UE to an eNB. Further, certain embodiments of this disclosure provide rules for transmitting UL information types when one or more repetitions for a transmission of a first information type at least partially overlap with one or more repetitions of a second information type.

The following embodiments are not limited to LC-UEs and can be applicable to any type of UEs requiring coverage enhancements. This includes UEs that can receive over the entire DL system BW or transmit over the entire UL system BW at a given time instance.

A first embodiment of the disclosure considers a CQI range for LC-UEs.

The wideband CQI mapping in TABLE 1 is not directly applicable for LC-UE 114 at least due to the difference in the number of receiver antennas as the CQI mapping in TABLE 1 is applicable for UEs with two receiver antennas while LC-UE 114 is assumed to have one receiver antenna. Therefore, for a same efficiency (modulation order and code rate) in TABLE 1, different PDSCH SINRs are required for LC-UE 114. For operation in an Additive White Gaussian Noise (AWGN) channel and equivalent antennas, a range of SINRs that can be achieved by a UE with two receiver antennas has a positive shift of 3 dB relative to a range of SINRs that can be achieved by LC-UE 114 with one receiver antenna. Moreover, as the SINR difference between successive entries in TABLE 1 is about 1.89 dB, TABLE 1 can be modified for LC-UE 114 by removing the last one or the last two highest entries and introducing new one or new two lowest entries, respectively. For example, TABLE 2 with two new lowest entries added can serve as a 4-bit wideband CQI table for LC-UE 114 and, while TABLE 1 spans an SINR range starting from −7 dB for a UE with two receiver antennas, TABLE 2 spans an SINR range starting from −10 dB for a UE with two receiver antennas or from −7 dB for LC-UE 114. For example, TABLE 3 with one new lowest entry added can serve as a 4-bit wideband CQI table for LC-UE 114. As LC-UE 114 does not support 64 QAM, the corresponding entries in TABLE 2 and TABLE 3 are reserved.

TABLE 2

First 4-bit CQI Table for LC-UEs

| CQI Bits | CQI index | Modulation | code rate × 1024 | efficiency | Comment |
|---|---|---|---|---|---|
| 0000 | 0 | | out of range | | |
| 0001 | 1 | QPSK | 41 | 0.0800 | |
| 0010 | 2 | QPSK | 58 | 0.1133 | |
| 0001 | 3 | QPSK | 78 | 0.1523 | |
| 0010 | 4 | QPSK | 120 | 0.2344 | |
| 0011 | 5 | QPSK | 193 | 0.3770 | |
| 0100 | 6 | QPSK | 308 | 0.6016 | |
| 0101 | 7 | QPSK | 449 | 0.8770 | |
| 0110 | 8 | QPSK | 602 | 1.1758 | |
| 0111 | 9 | 16QAM | 378 | 1.4766 | |
| 1000 | 10 | 16QAM | 490 | 1.9141 | |
| 1001 | 11 | 16QAM | 616 | 2.4063 | |
| 1010 | 12 | 64QAM | 466 | 2.7305 | Entry is reserved when no 64QAM |
| 1011 | 13 | 64QAM | 567 | 3.3223 | Entry is reserved when no 64QAM |
| 1100 | 14 | 64QAM | 666 | 3.9023 | Entry is reserved when no 64QAM |
| 1101 | 15 | 64QAM | 772 | 4.5234 | Entry is reserved when no 64QAM |

TABLE 3

Second 4-bit CQI Table for LC-UEs

| CQI Bits | CQI index | Modulation | code rate × 1024 | efficiency | Comment |
|---|---|---|---|---|---|
| 0000 | 0 | | out of range | | |
| 0001 | 1 | QPSK | 41 | 0.0800 | |
| 0010 | 2 | QPSK | 78 | 0.1523 | |
| 0001 | 3 | QPSK | 120 | 0.2344 | |
| 0010 | 4 | QPSK | 193 | 0.3770 | |
| 0011 | 5 | QPSK | 308 | 0.6016 | |
| 0100 | 6 | QPSK | 449 | 0.8770 | |
| 0101 | 7 | QPSK | 602 | 1.1758 | |
| 0110 | 8 | 16QAM | 378 | 1.4766 | |
| 0111 | 9 | 16QAM | 490 | 1.9141 | |
| 1000 | 10 | 16QAM | 616 | 2.4063 | |
| 1001 | 11 | 64QAM | 466 | 2.7305 | Entry is reserved when no 64QAM |
| 1010 | 12 | 64QAM | 567 | 3.3223 | Entry is reserved when no 64QAM |
| 1011 | 13 | 64QAM | 666 | 3.9023 | Entry is reserved when no 64QAM |
| 1100 | 14 | 64QAM | 772 | 4.5234 | Entry is reserved when no 64QAM |
| 1101 | 15 | 64QAM | 873 | 5.1152 | Entry is reserved when no 64QAM |

When LC-UE 114 receives only in a sub-band of six RBs in a DL system BW, LC-UE 114 typically experiences small frequency selectivity for a single PDSCH reception in a single respective SF and CQI variations for LC-UE 114 can be primarily attributed to path-loss variations that occur at a much slower rate than channel variations due to frequency selective fading. Then, when no frequency hopping applies for PDSCH or M-PDCCH transmissions, eNB 102 can alternatively use a RSRP report from LC-UE 114 to determine a CQI for LC-UE 114 and eNB 102 can avoid configuring LC-UE 114 for periodic CQI reports.

Alternatively, when LC-UE 114 reports a RSRP or a CQI, for example according to TABLE 2 or TABLE 3, or when eNB 102 determines a path-loss for LC-UE 114, eNB 102 can configure, for example by RRC signaling, LC-UE 114 to subsequently report CQI for a subset of values in TABLE 2 or TABLE 3. For example, eNB 102 can configure LC-UE 114 to report CQI for 4 values (using 2 binary elements to represent the 4 values). For example, when LC-UE 114 first reports a RSRP or a CQI over the full range of values in TABLE 2 or TABLE 3, eNB 102 can configure LC-UE 114 to subsequently report four CQI values wherein one value can be a previously reported CQI value (or a value determined from the RSRP report), two values can be the immediately two lower ones than the reported value, if any, and one value can be the immediately higher one than the reported value, if any. When there is no one or two lower values or one higher value than the previously reported value, such missing values can be replaced with the next one or two higher ones or the next lower one, respectively. For example, after LC-UE 114 reports a CQI value covering the entire range of CQI values in TABLE 2 or TABLE 3 and a respective CQI value corresponds to CQI index 7, eNB 102 can configure LC-UE 114 to subsequently report CQI values corresponding to CQI indexes 5, 6, 7, and 8.

Alternatively, a receiver in eNB 102, such as RX processing circuitry 225, RF transceiver 210 or a combination thereof, can positively bias detection of CQI values that are near a previously reported CQI value or are expected based on a RSRP report or a path-loss estimate. For example, the receiver in eNB 102 can constrain detection for a CQI value within a small number of CQI values that are close to a previously reported CQI value, for example according to TABLE 1 or TABLE 2 or TABLE 3. For example, when LC-UE 114 reports a CQI value corresponding to a CQI index of 7, the receiver in eNB 102 can bias a detection of a subsequent CQI value assuming that the LC-UE indicates a CQI index of 5, 6, 7, 8, or 9.

When eNB 102 configures LC-UE 114 with repetitions over a number of SFs for a PDSCH transmission, eNB 102 can further configure LC-UE 114 with only QPSK modulation for PDSCH transmissions to UE 114. The CQI mapping can then be as, for example, in TABLE 4.

TABLE 4

3-bit CQI Table for LC-UEs with only QPSK Modulation for PDSCH

| CQI Bits | CQI index | Modulation | code rate × 1024 | efficiency |
|---|---|---|---|---|
| 0000 | 0 |  | out of range |  |
| 0001 | 1 | QPSK | 53 | 0.1035 |
| 0001 | 2 | QPSK | 78 | 0.1523 |
| 0010 | 3 | QPSK | 120 | 0.2344 |
| 0011 | 4 | QPSK | 193 | 0.3770 |
| 0100 | 5 | QPSK | 308 | 0.6016 |
| 0101 | 6 | QPSK | 449 | 0.8770 |
| 0110 | 7 | QPSK | 602 | 1.1758 |

Moreover, in certain embodiments, as LC-UE 114 can be configured with repetitions for a PDSCH transmission over a number of SFs, for example when the spectral efficiency is below 0.3770, LC-UE 114 can report only the first (lower) four CQI indexes in TABLE 4, that is CQI indexes 0, 1, 2, and 3, and require 2 bits for their representation. In certain embodiments, eNB 102 can configure using RRC signaling LC-UE 114 to report a subset of CQI indexes, such as for example CQI indexes 1, 2, 3, and 4.

A second embodiment of the disclosure considers a derivation of wideband CSI and of sub-band CSI for a LC-UE from sub-bands configured for PDSCH transmission to the LC-UE.

In a first approach, a definition of wideband CQI in the frequency domain for a LC-UE configured with a number of repetitions for a PDSCH transmission over a number of SFs and over a number of sub-bands of a DL system BW using frequency hopping is relative to the configured sub-bands for a PDSCH transmission, instead of the entire DL system BW. For example, when eNB 102 configures LC-UE 114 with eight repetitions for a PDSCH transmission, where four repetitions occur in a first sub-band of six RBs of a DL system BW and the remaining four repetitions occur in a second sub-band of six RBs of the DL system BW, the wideband CQI is defined relative to the two sub-bands. For example, when eNB 102 configures LC-UE 114 with sixteen repetitions for a PDSCH transmission where four repetitions occur in each of a first, second, third, and fourth sub-bands of six RBs of a DL system BW, the wideband CQI is defined relative to the four sub-bands.

In a second approach, a definition of wideband CQI in the frequency domain for a LC-UE configured with repetitions for a PDSCH transmission over a number of SFs and over a number of sub-bands of a DL system BW using frequency hopping is relative to the sub-bands used for the last PDSCH transmission. For example, when eNB 102 configures LC-UE 114 with sixteen repetitions for a PDSCH transmission where four repetitions can occur in each of a first, second, third, and fourth sub-bands of six RBs of a DL system BW, and for an actual PDSCH transmission with eight repetitions where four repetitions occur in each of the first and second sub-bands, the wideband CQI is defined relative to the first and second sub-bands. The second approach allows LC-UE 114 to always report the most recent wideband CQI as, in the previous example, it is not be possible for LC-UE 114 to measure wideband CQI by including the third and fourth sub-bands when UE 114 receives a PDSCH only in the first and second sub-bands. Conversely, with the first approach, LC-UE 114 can report the latest CQI the LC-UE has available over the four sub-bands.

In a first alternative, a definition of wideband CQI in the time domain for a LC-UE configured with repetitions for a PDSCH transmission over a number of $N_{PDSCH}>1$ SFs is relative to the configured (maximum) number of $N_{PDSCH}>1$ SFs, instead of a single SF. The actual number of repetitions for a PDSCH transmission can be adjusted relative to the configured (maximum) number by a DCI format scheduling the PDSCH transmission. For example, when LC-UE 114 is configured by eNB 102 with repetitions for a PDSCH transmission over $N_{PDSCH}=16$ SFs wherein four repetitions occur in each of four sub-bands, LC-UE 114 performs CRS measurements over SFs in each of the four sub-bands and determines a CQI relative to CRS measurements corresponding to four SFs in each of the four sub-bands. In case eNB 102 configures LC-UE 114 with a set of number of repetitions for a PDSCH transmission, such as {1, 2, 4, 8} repetitions, the definition of wideband CQI can be over the maximum number of SFs for repetitions, such as over $N_{PDSCH}=8$ SFs.

In a second alternative, a definition of wideband CQI in the time domain for a LC-UE 114 configured with repetitions for a PDSCH transmission over a number of SFs is relative to a number of SFs and sub-bands used for a last PDSCH transmission. This allows LC-UE 114 to always report a most recent wideband CQI as, otherwise, it may not be possible for LC-UE 114 to compute the wideband CQI. For example, when eNB 102 configures LC-UE 114 with sixteen repetitions for a PDSCH transmission wherein four repetitions occur in each of four sub-bands and LC-UE 114 receives a PDSCH that is transmitted with eight repetitions in two sub-bands of the four sub-bands, LC-UE 114 may be unable to determine the CQI in the remaining two sub-bands of the four sub-bands. LC-UE 114 can be informed of the actual number of repetitions, relative to a maximum configured number of repetitions, for a PDSCH transmission through a field in a DCI format scheduling the PDSCH. For example, a 2-bit field in a DCI format can indicate whether the number of repetitions for a respective PDSCH transmission is equal to the one configured by eNB 102 through higher layer signaling or whether it is equal to one of three other numbers that are predetermined in the system operation or are also configured by eNB 102 through higher layer signaling. LC-UE 114 can either report wideband CQI for the eight repetitions or normalize (by multiplying by 2) the wideband CQI value and always report wideband CQI for the maximum number of configured repetitions, that is for 16 repetitions.

In determining a sub-band CQI, LC-UE 114 can first compute a SINR for the sub-band by performing filtering, such as averaging, of a received CRS over a number of SFs in the sub-band. Sub-band CQI can then be defined relative to a number of SFs that LC-UE 114 is configured to receive repetitions of a PDSCH transmission in the sub-band. For example, when LC-UE 114 is configured a maximum of $N_{PDSCH}=8$ repetitions where four repetitions occur in a first sub-band and four repetitions occur in a second sub-band, sub-band CQI can be defined relative to four repetitions (in respective 4 SFs). Alternatively, LC-UE 114 can determine the sub-band CQI by scaling (normalizing) the combined SINR obtained over a number of repetitions in a sub-band by the ratio of a total (maximum) number of SFs that LC-UE 114 is configured to receive repetitions of a PDSCH transmission over the number of SFs the LC-UE is configured to receive repetitions of a PDSCH transmission in the sub-band (for the total number of SFs). Therefore, both wideband CQI and sub-band CQI are defined relative to the maximum number of PDSCH repetitions. The latter determination of the CQI can also be useful to provide information to eNB 102 for link adaptation in case all repetitions of a PDSCH transmission occur in the sub-band (that is, when there is no frequency hopping for the PDSCH transmission).

Regardless of a size of a DL system BW, a sub-band CQI for LC-UE 114 can be defined over six RBs or can be defined over a number of RBs such as one RB. LC-UE 114 can determine the wideband CQI from the average SINR over the maximum number of SFs that LC-UE 114 is configured to receive a PDSCH transmission in each configured sub-band (according to the first approach) or from the average SINR over the number of SFs in each sub-band that LC-UE 114 actually receives a PDSCH transmission (according to the second approach).

Figure 10:
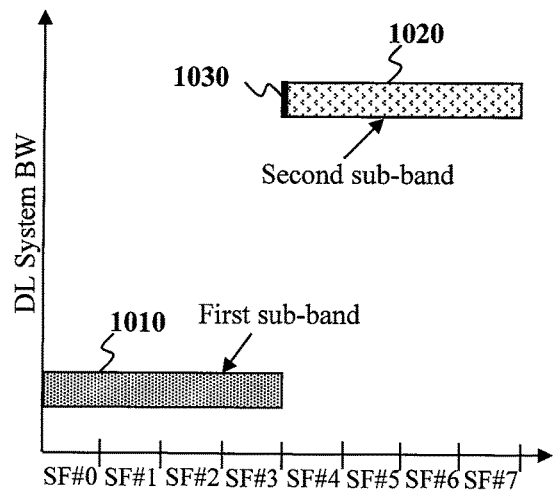
FIG. 10 illustrates a determination of a wideband CQI and of a sub-band CQI by a LC-UE according to this disclosure.

FIG. 10 illustrates a determination of a wideband CQI and of a sub-band CQI by a LC-UE according to this disclosure. The example shown in FIG. 10 is for illustration only and other examples could be used without departing from the scope of the present disclosure.

The eNB 102 configures LC-UE 114 to receive repetitions of a PDSCH transmission over a maximum of eight SFs and over two sub-bands of a DL system BW. The first four repetitions in respective first four SFs are in a first set of six RBs 1010. The second four repetitions in respective second four SFs are in a second set of six RBs 1020. UE 114 can suspend reception in one or more symbols of a first SF 1030 in the second set of six RBs in order to perform retuning for reception in the second set of six RBs. A receiver in LC-UE 114, such as RF transceivers 310a-310n, RX processing circuitry 320, or a combination thereof, does not use for CQI measurement a CRS that eNB 102 transmits in symbols that LC-UE 114 uses for retuning. LC-UE 114 measures a SINR based on a received CRS in the first set of six RBs and a SINR based on a received CRS in the second set of six RBs. Each measurement can include an arbitrary number of SFs but each sub-band CQI is obtained/defined for a SINR corresponding either to four SFs (maximum number of SFs that LC-UE 114 is configured to receive repetitions of a PDSCH transmission in the sub-band) or, by normalization, to eight SFs (maximum number of SFs that LC-UE 114 is configured to receive repetitions of a PDSCH transmission). For example, LC-UE 114 can measure a SINR by coherently combining a received CRS, or possibly also a DMRS in case UE 114 has a PDSCH reception, over a first number of SFs, such as four or eight SFs, and then averaging such SINRs over multiples of the first number of SFs. For example, LC-UE 114 can be expected to measure a SINR that is 10 $\log_{10}(4) \approx 6$ dB larger or 10 $\log_{10}(8) \approx 9$ dB larger than the SINR in one SF. The wideband CQI can be derived from an average of the two SINRs corresponding to RS combining over four SFs in the two sub-bands.

As LC-UE 114 requiring a large CE level, such as above 6 dB, can have wideband SINR that is too low for LC-UE 114 to obtain sufficiently accurate wideband SINR measurements, eNB 102 can configure LC-UE 114 to not report wideband CQI. However, sub-band SINR can be sufficiently high to provide respective SINR measurements with sufficient accuracy. Therefore, a CQI reporting mode that does not include wideband CQI but includes sub-band CQI can be defined.

Certain embodiments of the disclosure consider a derivation of wideband CSI and of sub-band CSI for a LC-UE from sub-bands configured for M-PDCCH transmissions to the LC-UE 114.

A LC-UE 114 can be configured a set of sub-bands to receive repetitions of an M-PDCCH transmission over a number of SFs. When the sub-bands or the number of SFs for repetitions of an M-PDCCH transmission are different than the sub-bands or the number of SFs for repetitions of a PDSCH transmission, a separate CQI can be computed for an M-PDCCH transmission. A CQI for an M-PDCCH transmission can be used for adjusting a number of resources such as a number of SFs for repetitions of an M-PDCCH transmission or for repetitions of a PDSCH transmission. For the M-PDCCH, this is equivalent to adjusting a code rate for a DCI format conveyed by the M-PDCCH since, unlike a size or a modulation scheme for a data TB, the size of the DCI format is fixed and QPSK modulation is always used. The eNB 102 can use an efficiency indicated by a CQI for data TB transmission in a PDSCH to derive an efficiency for a DCI format transmission in an M-PDCCH, or the reverse. LC-UE 114 can compute a CQI based on sub-bands that LC-UE 114 is configured by eNB 102 for repetitions of an M-PDCCH transmission in a directly analogous manner as for computing a CQI based on sub-bands UE 114 is configured by eNB 102 for repetitions of a PDSCH transmission. The respective descriptions are not replicated for brevity.

A first example for LC-UE 114 to provide a CQI for an M-PDCCH transmission is to provide an indication for a number of repetitions from a predetermined set of numbers of repetitions. For example, eNB 102 can configure LC-UE 114 with four possible numbers for repetitions of an M-PDCCH transmission wherein at least a first number is configured to LC-UE 114 by higher layer signaling and the other three numbers are either also configured to LC-UE 114 by higher layer signaling or are derived in a predetermined manner from the first number. For example, the other three numbers can be one half, one quarter, and one eighth of the first number. LC-UE 114 provides CQI for the configured (maximum) number of M-PDCCH repetitions.

A second example for LC-UE 114 to provide a CQI for an M-PDCCH transmission is to provide an indication relative to a CQI of a PDSCH transmission. A differential indication for a CQI for an M-PDCCH transmission can include, for example, 2-bits representing four differential values relative to a CQI for a PDSCH transmission wherein the four values can include the two immediately lower values, the same value, and the next higher value of the indicated CQI value for the PDSCH transmission. When a particular value does not exist, for example when a CQI for a PDSCH transmission is already the lowest one and two lower values for a CQI of an M-PDCCH transmission cannot be indicated, that value can either remain non-applicable or can be replaced by the next available value such as for example the next two higher values than the next immediately higher value for the CQI of the PDSCH transmission.

A third example for LC-UE 114 to provide a CQI for an M-PDCCH transmission is to provide a separate indication than for a CQI for a PDSCH transmission. LC-UE 114 can also provide two separate CQI reports, a first for a PDSCH transmission and a second for M-PDCCH transmission. The eNB 102 can configure the two separate CQI reports to occur in separate PUCCH transmissions or in separate PUSCH transmissions, or in a same PUCCH transmission or in a same PUSCH transmission.

A fourth example is for LC-UE 114 to not explicitly provide a CQI either for an M-PDCCH transmission or for a PDSCH transmission. Instead, eNB 102 can use a CQI obtained over the sub-bands of either a PDSCH transmission or of an M-PDCCH transmission to derive a CQI for either an M-PDCCH transmission or for a PDSCH transmission, respectively. For example, when the one or more sub-bands for an M-PDCCH transmission coincide or are located near the one or more sub-bands for a PDSCH transmission, eNB 102 can assume a same respective sub-band CQI or a same wideband CQI for the M-PDCCH transmission and for the PDSCH transmission. Alternatively, when the one or more sub-bands for an M-PDCCH transmission are not located near the one or more sub-bands for a PDSCH transmission, eNB 102 can derive a sub-band CQI for either the M-PDCCH transmission or for the PDSCH transmission by interpolating selected sub-band CQIs for either the PDSCH transmission or for the M-PDCCH transmission, respectively. The fourth example is motivated based on the fact that when LC-UE 114 is not in a DRX state, LC-UE 114 regularly attempts to detect an M-PDCCH in respective sub-bands while it is possible that LC-UE 114 does not have regular PDSCH transmissions and therefore cannot determine a CQI in sub-bands of a PDSCH transmission. Moreover, sub-bands for a PDSCH transmission can be dynamically indicated by a DCI format scheduling the PDSCH transmission and in such case LC-UE does not have prior knowledge of sub-bands for a subsequent PDSCH transmission in order to measure and report associated CSI.

A fifth example is to configure same sub-bands to LC-UE 114 for repetitions of a PDSCH transmission and for repetitions of an M-PDCCH transmission in order for eNB 102 to directly use a CQI report from LC-UE 114 for link adaptation of the PDSCH transmission or of the M-PDCCH transmission. As the CQI for a PDSCH transmission is derived relative to a number of configured (maximum) SFs for repetitions of the PDSCH transmission or of the M-PDCCH transmission, eNB 102 can adjust the reported CQI for a number of SFs corresponding for repetitions of an M-PDCCH transmission or of a PDSCH transmission, respectively. For example, when LC-UE 114 reports a CQI (efficiency) derived for a PDSCH transmission with a maximum configured number of $N_{PDSCH}$ repetitions, eNB 102 can determine a CQI (efficiency) for an M-PDCCH transmission with a maximum of $N_{M\text{-}PDCCH}$ repetitions by scaling the indicated efficiency for the PDSCH transmission by $N_{M\text{-}PDCCH}/N_{PDSCH}$. Similar, when LC-UE 114 reports a CQI (efficiency) derived for a PDSCH transmission with a maximum configured number of $N_{PDSCH}$ repetitions, eNB 102 can determine a CQI (efficiency) for a PDSCH transmission with a number of $N_{PDSCH,1}$ repetitions, $N_{PDSCH,1}<N_{PDSCH}$, by scaling the indicated efficiency for the PDSCH transmission by $N_{PDSCH,1}/N_{PDSCH}$.

Figure 11:
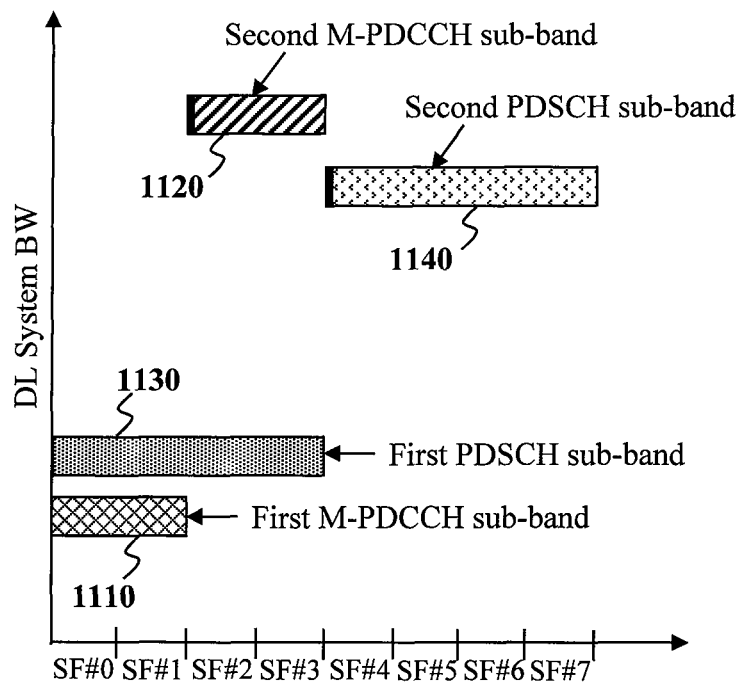
FIG. 11 illustrates a determination by an eNB of a CQI for a PDSCH transmission to a LC-UE based on a CQI reported by the LC-UE based on measurements in sub-bands configured for an M-PDSCH transmission according to this disclosure.

FIG. 11 illustrates a determination by an eNB of a CQI for a PDSCH transmission to a LC-UE based on a CQI reported by the LC-UE based on measurements in sub-bands configured for an M-PDSCH transmission according to this disclosure. The example shown in FIG. 11 is for illustration only. Other embodiments could be used without departing from the scope of the present disclosure.

An eNB, such as eNB 102, configures a LC-UE, such as LC-UE 114, with a first sub-band 1110 and a second sub-band 1120 for repetitions of an M-PDCCH transmission and with a first sub-band 1130 and a second sub-band 1140 for repetitions of a PDSCH transmission. LC-UE 114 provides a CQI for the first M-PDCCH sub-band 1110 and a CQI for the second M-PDCCH sub-band 1120 used for repetitions of an M-PDCCH transmission or the LC-UE 114 provides a wideband CQI for first M-PDCCH sub-band 1110 and second M-PDCCH sub-band 1120. As a function of the CQI for the first M-PDCCH sub-band 1110, or for the second M-PDCCH sub-band 1120, or on the wideband CQI over the first M-PDCCH sub-band 1110 and the second M-PDCCH sub-band 1120, eNB 102 can respectively derive a CQI estimate for repetitions of a PDSCH transmission in the first PDSCH sub-band 1130, or in the second PDSCH sub-band 1140, or a wideband CQI for repetitions of the PDSCH transmission in the first PDSCH sub-band 1130 and in the second PDSCH sub-band 1140. For example, for a given sub-band used for repetitions of a PDSCH transmission, eNB 102 can assume a same CQI as for a proximate sub-band used for repetitions of an M-PDCCH transmission. For example, for a first PDSCH sub-band used for repetitions of a PDSCH transmission that is located between two M-PDCCH sub-bands for an M-PDCCH transmission that LC-UE 114 provides respective sub-band CQI, eNB 102 can interpolate the two M-PDCCH sub-band CQIs to obtain an estimate for the first PDSCH sub-band CQI.

As an alternative to LC-UE 114 separately reporting CQI for PDSCH sub-bands and M-PDCCH sub-bands, eNB 102 can configure LC-UE 114 the sub-bands that LC-UE 114 reports CQI. These sub-bands are subsequently referred to as CQI sub-bands. The CQI sub-bands can be the same as the M-PDCCH sub-bands (no separate configuration) or be separately configured or, in general, separately determined than the sub-bands of a PDSCH transmission (PDSCH sub-bands) that are dynamically determined by a DCI format scheduling the PDSCH transmission, or the sub-bands for an M-PDCCH transmission (M-PDCCH sub-bands). The CQI sub-bands can include either or both the sub-bands for PDSCH transmission and the sub-bands for M-PDCCH transmission. By LC-UE 114 reporting CQI derived over a maximum configured number of repetitions for a PDSCH transmission and computed over the CQI sub-bands, eNB 102 can determine a wideband CQI and sub-band CQIs over the sub-bands or a wideband CQI and sub-band CQIs over the sub-bands of M-PDCCH transmission. For example, in FIG. 11, the CQI sub-bands can be the M-PDCCH sub-bands. A configuration of CQI sub-bands can be combined with a configuration of no frequency hopping for M-PDCCH or for PDSCH transmissions. In that case, a wideband CQI can be reduced to a sub-band CQI and LC-UE 114 does not need to also report sub-band CQI for M-PDCCH transmission or for PDSCH transmission.

The eNB 102 can also configure LC-UE 114 to not report wideband CQI, or equivalently, not configure LC-UE 114 to report wideband CQI, when eNB 102 determines that LC-UE 114 requires a CE level that is too large for LC-UE 114 to accurately measure a wideband CQI. However, eNB 102 can still configure LC-UE 114 to report sub-band CQI as the SINR that LC-UE 114 can experience for signal receptions in a sub-band can be sufficiently high to enable an accurate CQI measurement for the sub-band.

A fourth embodiment of the disclosure considers CSI measurement and reporting aspects from LC-UE 114.

A determination of sub-bands in a DL system BW can be, for example, as follows. A number of available sub-bands in a DL system BW of $M_{RB}^{DL}$ RBs is equal to $\lfloor M_{RB}^{DL}/6 \rfloor$ where a sub-band is assumed to include 6 RBs and $\lfloor \ \rfloor$ is the 'floor' function that rounds a number to its immediately lower integer. As eNB 102 can boost, when possible, a transmission power to LC-UE 114 in order to reduce a required number of repetitions for a respective channel, it can be beneficial to place the sub-bands in the interior of the DL system BW in order to reduce an effect of out-of-band emissions. Then, the available sub-bands exclude $M_{RB}^{DL} - \lfloor M_{RB}^{DL}/6 \rfloor \cdot 6$ RBs where an indexing of excluded RBs alternates between lowest indexed ones and highest indexed ones. For example, for $M_{RB}^{DL}=50$ RBs, there can be 8 sub-bands over 48 RBs and the 2 excluded RBs are the lowest indexed one and the highest indexed one.

Figure 12:
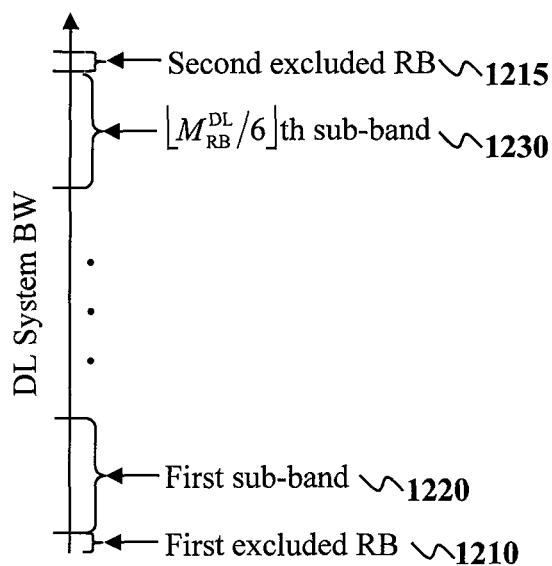
FIG. 12 illustrates a SRS transmission from a LC-UE using repetitions and frequency hopping in a set of sub-bands according to this disclosure.

FIG. 12 illustrates an allocation of sub-bands in a DL system BW according to this disclosure. The embodiment of the allocation shown in FIG. 12 is for illustration only. Other embodiments could be used without departing from the scope of the present disclosure.

A DL system BW includes $M_{RB}^{DL}=50$ RBs. A number of available sub-bands equal to $\lfloor M_{RB}^{DL}/6 \rfloor=8$ is defined where each sub-band includes six RBs and different sub-bands do not include any overlapping RBs. There are $M_{RB}^{DL} - \lfloor M_{RB}^{DL}/6 \rfloor \cdot 6=2$ RBs that are not allocated to any sub-band. The two RBs are the RB with the lowest index 1210 and the RB with the highest index 1215 in the DL system BW. The RBs of the DL system BW that exclude the first RB and the last RB are allocated to the $\lfloor M_{RB}^{DL}/6 \rfloor$ sub-bands where all sub-bands include mutually different RBs and where the first sub-band 720 includes the 6 lower indexed RBs (other than the first RB of the DL system BW) and the last sub-band 730 includes the 6 highest indexed RBs in the DL system BW (other than the last RB of the DL system BW).

In a first approach, a configuration of sub-bands for PDSCH or M-PDCCH transmission to LC-UE 114 can be part of the configuration for RRC connection of LC-UE 114 with eNB 102 after LC-LE 114 has established initial access with eNB 102. A number of possible signaling formats are available. For example, such an allocation can indicated by a bitmap of length-$\lfloor M_{RB}^{DL}/6 \rfloor$ bits where a location of one-valued bits indicates sub-band indices associated with a set of allocated sub-bands. A number of sub-bands $N_{SB}$ of a PDSCH or M-PDCCH transmission from a total of $\lfloor M_{RB}^{DL}/6 \rfloor$ sub-bands, corresponding to the number of one-valued bits in the bitmap, can also be included.

Having defined a resource allocation method for DL, CSI reporting methods are described below. Each of the methods described below pertains to one CSI process.

The following transmission characteristics are considered in a design of a CSI reporting payload content suitable for LC-UE 114. First, as LC-UE 114 is assumed to be equipped with one receiver antenna, a rank-one DL transmission (or one-layer in case of spatial multiplexing) is imposed. Therefore, only one set of CQIs associated with a single codeword (referenced as "codeword 0") is included in a CSI report. Second, since only rank-one transmission is assigned to LC-UE 114, RI is not reported by LC-UE 114. Then, a payload of CSI reporting remains same for a configured number of measurement CRS antenna ports. Therefore, a CSI report includes only of one set of CQIs associated with a single codeword when any of transmission modes 1, 2, 3, or 7 is configured. When any of transmission modes 4, 5, 6, 8, 9, or 10 is configured, a CSI report includes of one set of CQIs associated with a single codeword and a PMI associated with RI=1 (rank-1) recommendation (when a CSI report mode configured by higher layer signaling to LC-UE 114 includes PMI reporting) and the PMI payload depends on a number of measurement CRS antenna ports and a configured PMI codebook. Not all transmission modes supported by a UE with two receiver antennas need to be supported by LC-UE 114. For example, LC-UE 114 can support only transmission modes 1, 2, 6, and 8 or 9.

In a first approach, the aforementioned "one set of CQIs" (representing only a single codeword) includes only one wideband CQI that LC-UE 114 calculates assuming transmission from eNB 102 on a set S of subbands. The first approach can be associated with PUSCH-based A-CSI reporting mode 1-2 as well as PUCCH CSI reporting modes 1-0 and 1-1 (see also REF 3). New reporting modes can also be defined for LC-LE 114; for example PUSCH-based A-CSI reporting mode 1-0 and/or 1-1 and/or 2-1 can be defined for LC-UE 114, as shown in TABLE 5. A benefit from defining new reporting modes for LC-UE 114 is that they can simplify CQI calculations and reduce reporting overhead, for example, mode 1-0 and mode 1-1 have smaller reporting overhead than mode 1-2 since a number of reported PMIs is smaller. Further, to simplify implementation for LC-UE 114, certain reporting modes that are supported by UEs with two receiver antennas are not supported by LC-UE 114. For example, LC-UE 114 can avoid supporting PUSCH-based aperiodic mode 1-2, or mode 2-2, or mode 3-2. Therefore, in case the sub-bands for CQI reporting are selected by LC-UE 114, only mode 2-0 is supported (and an explicit configuration of the CSI reporting mode can be avoided) while in case eNB 102 configures LC-UE 114 the sub-bands for CQI reporting, only mode 3-0 or mode 3-1 are supported.

TABLE 5

A-CSI Reporting Modes

| | | PMI Feedback Type | | |
|---|---|---|---|---|
| | | No PMI | Single PMI | Multiple PMI |
| PUSCH CQI Feedback Type | Wideband (wideband CQI) | Mode 1-0 (can be applicable to LC-UE only) | Mode 1-1 (can be applicable to LC-UE only) | Mode 1-2 |
| | UE Selected (sub-band CQI) | Mode 2-0 | Mode 2-1 (can be applicable to LC-UE only) | Mode 2-2 |
| | Higher Layer-configured (sub-band CQI) | Mode 3-0 | Mode 3-1 | Mode 3-2 |

In a second approach, the aforementioned "one set of CQIs" (representing only a single codeword) includes a plurality of sub-band CQIs. One sub-band CQI is reported for each set S of sub-bands where LC-UE 114 calculates a sub-band CQI value assuming transmission only in the sub-band. Each of the sub-band CQIs can be encoded according to one of the two following alternatives. In a first alternative, a plurality of sub-bands CQIs are accompanied with a wideband CQI, as described in the first approach. Each of the sub-band CQIs is differentially encoded with respect to their respective wideband CQI using a smaller number of bits than a number of bits used for the reference wideband CQI for example as described in TABLE 0 and "sub-band differential CQI offset level=sub-band CQI index–wideband CQI index". This embodiment can be associated with PUSCH-based A-CSI reporting mode 2-0, 2-2, 3-0, 3-1, or 3-2 as well as PUCCH-based P-CSI reporting modes 2-0 and 2-1 (when a respective CSI reporting mode is supported). In a second alternative, sub-band CQIs are not reported together with a wideband CQI and each of the sub-band CQIs is encoded independently without any reference to and with a same number of bits as a wideband CQI.

When a PDSCH transmission to LC-UE 114 is with a number of repetitions corresponding to a large CE level, a fine measurement granularity may not be possible when a SINR, experienced by LC-HE 114 is very low (for example, less than −10 dB). Then, a granularity of either a wideband CQI or a sub-band CQI can be reduced to only indicate a number of repetitions LC-UE 114 requires to detect a data transport block with a predetermined MCS (see also REF 3) and detection reliability, such as a 10% BLER, for the PDSCH transmission mode. For example, either the wideband CQI or the sub-band CQI can be reduced to 2 bits that can indicate one out of four repetition numbers (number of SFs) for a PDSCH transmission with a predetermined MCS.

For CSI calculation, the "set S sub-bands" can be specified as follows (see also REF 3): "The set of sub-bands (S) a UE evaluates for CQI reporting spans the entire downlink system bandwidth." While this is suitable for UEs capable of receiving over the entire DL system BW, such a fixed and cell-specific configuration is not suitable for LC-UE 114 where a small number of sub-bands $N_{SB}$ is semi-statically configured to LC-UE 114 for M-PDCCH transmission. That is, sub-band configuration pertaining to LC-UE 114 is not only LC-UE-specific, but also corresponds to a small fraction of the entire DL system BW. To accommodate this operation, an alternative specification of the set S sub-bands that facilitates configuring LC-UE 114 to report CSI only for a part of the entire DL system BW is introduced so that the mechanism for CSI reporting can be better matched with the mechanism for DL resource allocation to LC-UE 114. This is beneficial for reducing UL feedback overhead incurred in CSI reporting and simplifying measurements for LC-UE 114.

To make the notion of set S more appropriate for reduced rate transmissions, several approaches are possible.

In a first approach, a LC-UE-specific higher-layer signaling in a form of an RRC (ASN.1) parameter is introduced and is referred to as SetS-SubBands. The parameter SetS-SubBands can include, for example, a bitmap of size $N_{SB}^{CSI}$ bits where a location of one-valued bits indicates sub-band indices associated with a set of allocated sub-bands, such as sub-bands for M-PDCCH transmission. While, in principle, this allows full flexibility of allocating any set of sub-bands for CSI feedback to LC-UE 114, it is reasonable for eNB 102 to configure this set as either a subset, an identical set, or a superset of the sub-bands configured for M-PDCCH transmissions to the LC-UE. When the set S of sub-bands includes more than one block of six consecutive RBs, LC-UE 114 cannot measure all set S sub-bands at a same time. LC-UE 114 measures set S sub-bands corresponding to sub-bands configured for M-PDCCH transmissions when LC-UE 114 is receiving M-PDCCH transmissions on those sub-bands and LC-UE 114 can tune its RF and measure the other set S sub-bands for one or multiple valid DL (or special) SFs when LC-UE 114 is not receiving M-PDCCH transmissions in those SFs.

In a second approach, the "set S sub-bands" is predetermined to be equivalent to a set of configured sub-bands for M-PDCCH transmissions from eNB 102 to LC-LTE 114. A same configuration applies for both sub-bands of M-PDCCH transmissions and for the set S for CSI reporting ($N_{SB}=N_{SB}^{CSI}$). This configuration can be implemented through LC-UE-specific RRC (higher-layer) signaling or included in a SIB Additionally, an enhancement can be through a one-bit LC-UE-specific signaling of an ASN.1/RRC, parameter that can indicate whether LC-UE 114 shall assume the set S sub-bands to include all sub-bands in the DL system BW or to be identical to the configured sub-band allocation for M-PDCCH transmissions. For example, when a parameter SetS of LC-UE 114 is X (where X represents all sub-bands in the DL system BW), LC-UE 114 shall assume that set S sub-bands are all sub-bands in the DL system BW. When a parameter SetS of LC-UE 114 is the negation of X (numeric, logical, or symbolic), LC-UE 114 shall assume that the set S sub-bands is same as the set of sub-bands LC-UE 114 is configured for M-PDCCH transmissions.

In a third approach, the set S sub-bands can be configured via a DCI format to be a subset of the sub-band allocation for M-PDCCH transmission. A field in a DCI format, either for PDSCH scheduling or for PUSCH scheduling, can indicate a subset selection of $N_{SB}^{CSI}$ sub-bands out of the $N_{SB}$ sub-bands configured to LC-UE 114 for M-PDCCH transmissions. Therefore, the set S sub-bands for CSI reporting is dynamically configured (by a DCI format) as a subset of a semi-statically configured (by higher layer signaling) sub-band allocation for DL transmissions, that is M-PDCCH transmissions. This approach allows further saving in CSI feedback overhead at the expense of a small increase in DL control overhead due to a respective field in a DCI format.

Similar, when applicable, LC-UE 114 performs PMI calculation assuming the aforementioned alternative definition of the set S sub-bands. That is, a wideband PMI represents a precoding matrix selection from a codebook subset assuming transmission on a set S sub-bands. A sub-band PMI represents a precoding matrix selection from the codebook subset assuming transmission only in the sub-band.

In summary, with the aforementioned alternative definition for set S sub-bands in conjunction with the aforementioned rank-one transmission restriction, a CSI report contains the following. In all of the modes below, rank reporting is disabled.

For A-CSI reporting on PUSCH, conditioned on rank-one
Either a wideband PMI or M sub-band PMIs (for a respective mode 1-2, 2-2, 3-1, or 3-2—see also REF 3).
Either wideband CQI (new mode 1-0 in TABLE 5) or wideband CQI and M sub-band CQIs (mode 2-0) associated with one codeword for a respective mode (see also REF 3). A variation of the latter alternative can be to encode sub-band CQIs differentially with respect to wideband CQI. Therefore, a report also includes wideband CQI for this variation.

For P-CSI reporting on PUCCH, conditioned on rank-one Wideband PMI (for mode 1-1 or 2-1)
Either wideband CQI (mode 1-0) or wideband CQI and M sub-band CQIs (mode 2-0) associated with one codeword. A variation of the latter alternative can be to encode sub-band CQIs differentially with respect to wideband CQI. Therefore, a report also includes wideband CQI for this variation.
For mode 2-0 or 2-1: PTI, defined in REF 3, can also be included.

The CSI reporting modes described in REF 3 can be used with the alternative definition of set S sub-bands, sub-band size of 6 RBs, and rank-1 conditioning (hence without RI reporting). For PUSCH-based A-CSI reporting modes 2-0 or 2-2, since a number of configured sub-bands for M-PDCCH transmission $N_{SB}$ is small for LC-UE 114, a value of M for modes 2-0 or 2-2 (representing the M selected sub-bands from the $N_{RB}^{CSI}$ sub-bands) can be set to 1. For example, when $N_{SB}=N_{RB}^{CSI}=2$, eNB 102 can derive a CQI for a second sub-band from a wideband CQI and a CQI for a first sub-band that UE 114 reports. A value of M=1 can also apply when $N_{SB}=N_{SB}^{CSI}=4$, even though eNB 102 cannot accurately derive a CQI for the remaining 3 sub-bands from a wideband CQI and a sub-band CQI reported by LC-UE 114, or a larger value such as M=2 can be used in that case.

Figure 13:
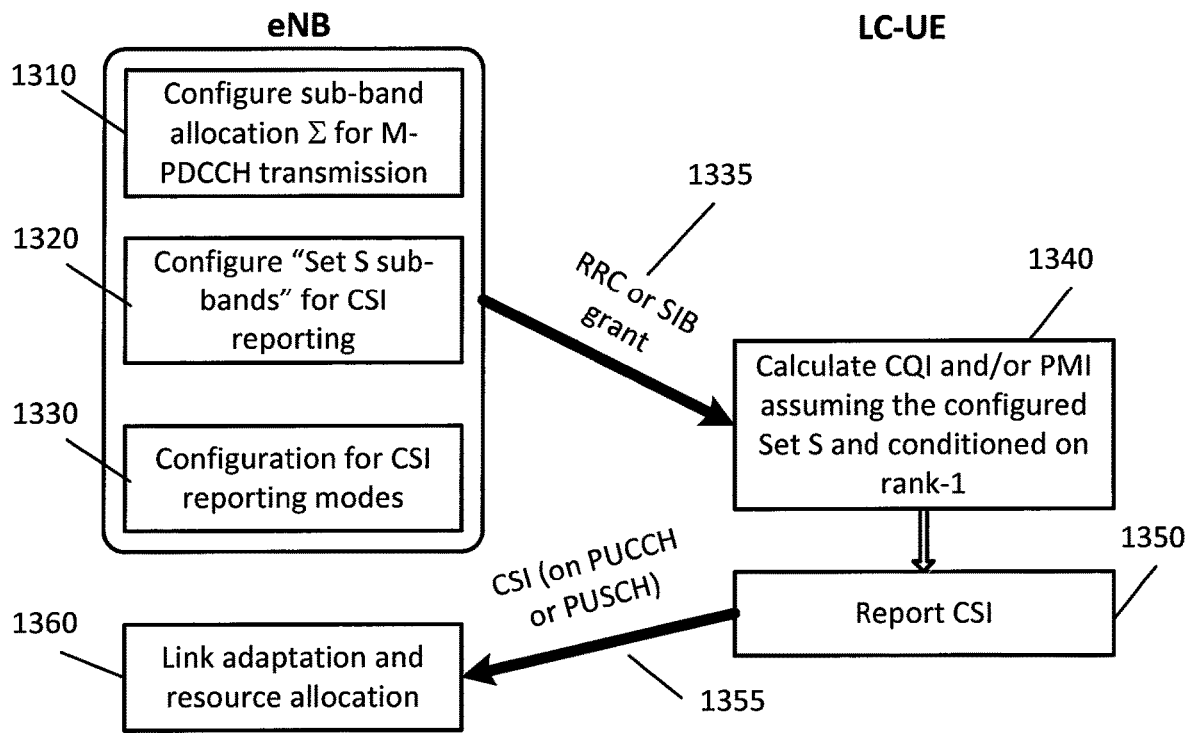
FIG. 13 illustrates a process for an eNB to determine a sub-band to configure to a LC-UE for PUSCH transmission according to this disclosure.

FIG. 13 illustrates eNB and LC-UE functionalities for CSI reporting when the eNB separately configures to LC-UE the set of sub-bands for CSI measurements and the set of sub-bands for M-PDCCH transmissions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by respective processors in, for example, a base station and a mobile station.

The eNB 102 separately configures LC-UE 114 a set of sub-bands for M-PDCCH transmissions in block 1310 and, in block 1320, configures a set S sub-bands for CSI reporting. In addition, in block 1330, eNB 102 separately configures LC-UE 114 with CSI reporting modes for PUCCH and PUSCH. Each configuration can be indicated either by UE-specific higher layer signaling, such as RRC signaling, or by UE-common RRC signaling in a SIB 1335. A configuration can be omitted when a default one applies, such as for example for A-CSI mode 2-0 when LC-UE 114 is not additionally configured the M sub-bands. Upon receiving and successfully decoding the configuration information, in block 1340 LC-UE 114 calculates CQI and PMI, when applicable, according to the configuration information and rank-1 conditioning. In block 1350, LC-UE 114 reports a resulting CQI and PMI, forming a unit of CSI, to eNB via PUCCH or PUSCH 1355 for link adaptation and resource allocation in block 1360 by eNB 102.

Figure 14:
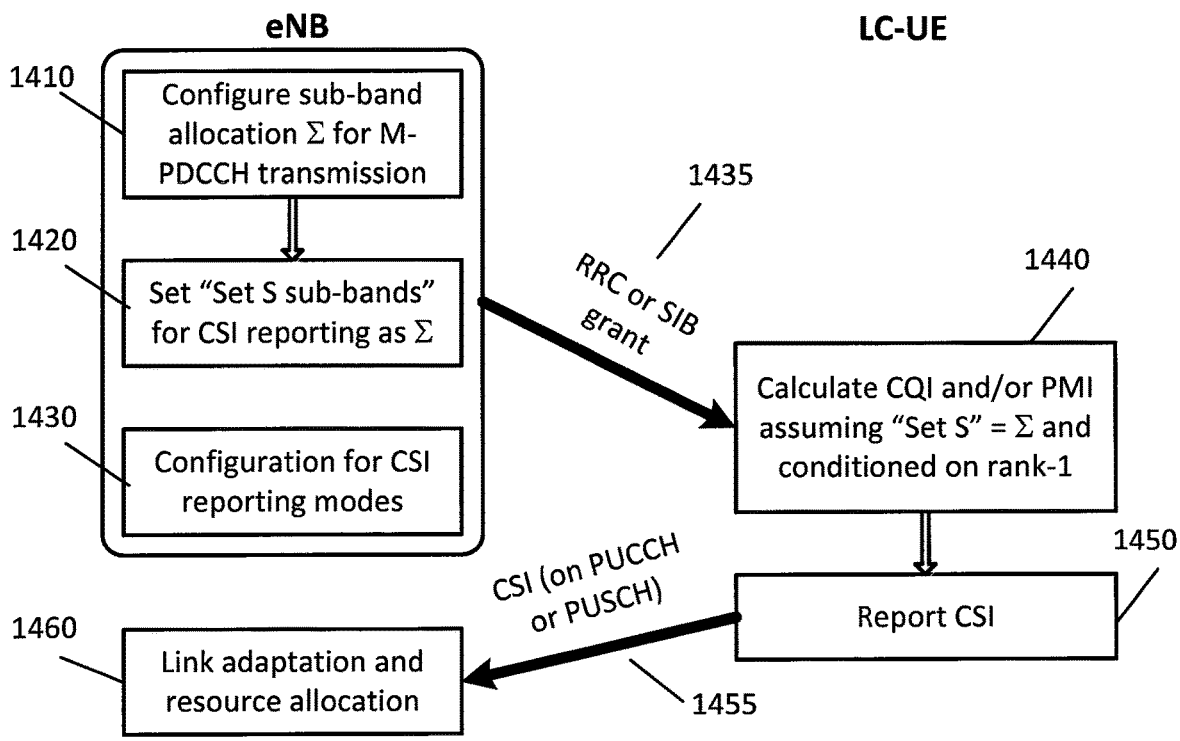
FIG. 14 illustrates eNB and LC-UE functionalities for CSI reporting when the set of sub-bands for CSI measurements is identical to the set of sub-bands for M-PDCCH transmissions according to this disclosure.

FIG. 14 illustrates eNB and LC-UE functionalities for CSI reporting when the set of sub-bands for CSI measurements is identical to the set of sub-bands for M-PDCCH transmissions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by respective processors in, for example, a base station and a mobile station.

The eNB 102 configures, in block 1410, LC-UE 114 a set of sub-bands for M-PDCCH transmissions that is identical to a set of sub-bands for CSI reporting in block 1420 (single configuration). In addition, eNB 102 separately configures, in block 1430, LC-UE 114 with CSI reporting modes for PUCCH and PUSCH. Each configuration can be indicated either by UE-specific higher layer signaling, such as RRC signaling, or by UE-common RRC signaling in a SIB 1435. A configuration can be omitted when a default one applies, such as for example for A-CSI mode 2-0 when LC-UE 114 is not additionally configured the M sub-bands. Upon receiving and successfully decoding the configuration information, LC-UE 114 calculates CQI and PMI, when applicable, according to the configuration information and rank-1 conditioning in block 1440. LC-UE 114 reports a resulting CQI and PMI in block 1450, forming a unit of CSI, to eNB via PUCCH or PUSCH 1455 for link adaptation and resource allocation in block 1460 by eNB 102.

Figure 15:
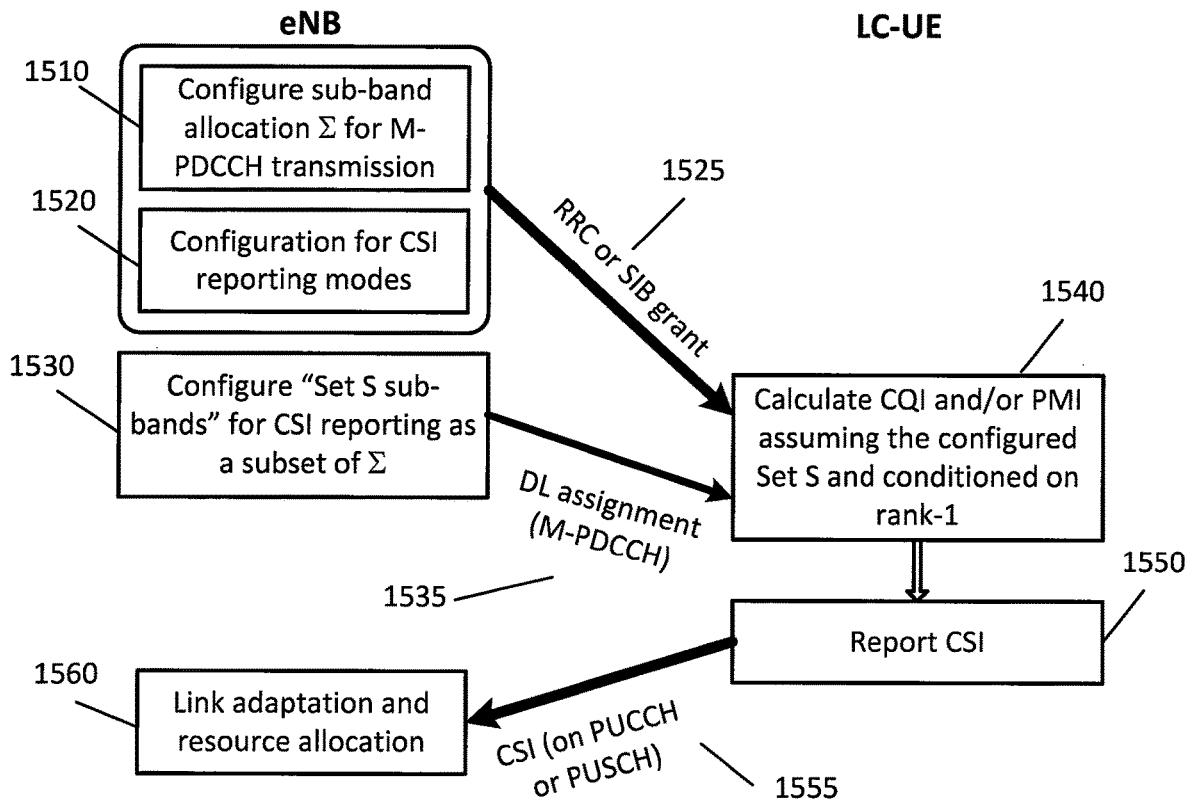
FIG. 15 illustrates eNB and LC-UE functionalities for CSI reporting when the eNB indicates through a DCI format a set of sub-bands for CSI measurements from a set of sub-bands for M-PDCCH transmissions according to this disclosure.

FIG. 15 illustrates eNB and LC-UE functionalities for CSI reporting when the eNB indicates through a DCI format a set of sub-bands for CSI measurements from a set of sub-bands for M-PDCCH transmissions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by respective processors in, for example, a base station and a mobile station.

The eNB 102 configures LC-UE 114 a set of sub-bands for M-PDCCH transmissions in block 1510 with CSI reporting modes in block 1520 for PUCCH and PUSCH. Each configuration can be indicated by UE-specific higher layer signaling, such as RRC signaling 1525. A configuration can be omitted when a default one applies, such as for example for A-CSI mode 2-0 when LC-UE 114 is not additionally configured the M sub-bands. In addition, eNB 102 configures LC-UE 114 a set of sub-bands for CSI reporting in block 1530 through dynamic signaling in a DCI format 1535. Upon receiving and successfully decoding the DCI format, LC-UE 114 calculates CQI and PMI, when applicable, according to the configuration information and rank-1 conditioning in block 1540. LC-UE 114 reports a resulting CQI and PMI, forming a unit of CSI 1550, to eNB via PUCCH or PUSCH 1555 for link adaptation and resource allocation in block 1560 by eNB 102.

A fifth embodiment of the disclosure considers link adaptation for PUSCH transmissions from a LC-UE.

PUSCH link adaptation for a UE that can transmit over an entire UL system BW can be enabled by a transmission from the UE of a SRS that an eNB, such as eNB 102, can receive and determine a channel or a SINR experienced by a signal transmitted by the UE in the sub-bands of the UL system BW where the UE transmits the SRS (see also REF 3). For a LC-UE 114 that does not require CE operation (repetitions) for UL transmissions, a same principle can apply. However, unlike a SRS hopping pattern for the former UE that can occur in the entire UL system BW, except for a number of RBs at the two edges of the UL BW where UEs typically transmit PUCCH (see also REF 1), a SRS hopping pattern for the latter LC-UE, such as LC-UE 114, can be confined to occur within a configured set of sub-bands. For example, a SRS transmission can be over four RBs and when a SRS transmission BW does not at least partially overlap with a configured sub-band for SRS transmission, LC-UE 114 can either suspend the SRS transmission at a respective SF or transmit SRS in a first BW determined according to a SRS hopping pattern (see also REF 1) that at least partially overlaps with a configured sub-band. SRS transmissions from LC-UE in a configured sub-band can enable an eNB 102 to determine SINRs experienced by signal transmissions from LC-UE 114 in the configured sub-band.

When LC-UE 114 requires CE for UL transmissions, such as PUSCH transmissions, it is possible that eNB 102 cannot accurately estimate an SINR for LC-UE 114 in a sub-band from a single SRS transmission from LC-UE 114 in the sub-band. To improve an accuracy of SINR estimation in a sub-band based on a SRS transmission from LC-UE 114 in the sub-band, a conventional SRS hopping pattern can be modified. A first modification is for eNB 102 to configure LC-UE 114 a number of $N_{SRS}$ SFs for successive SRS transmissions in a same sub-band prior to hopping to another sub-band where LC-UE 114 again successively transmits SRS in $N_{SRS}$ SFs. The eNB 102 can combine the successive SRS transmissions in each sub-band, for example by coherent averaging, and this can enable eNB 102 to obtain a more accurate SINR estimate in the sub-band as the SRS received power can be increased after combining. The configuration for the SRS transmissions can be for a single or for periodic repetitions of a SRS transmission over $N_{SRS}$ SFs in each sub-band. A second modification is for eNB 102 to configure to LC-UE 114 a set of sub-bands for SRS transmission instead of LC-UE 114 transmitting SRS over substantially the UL system BW. A third modification can be for the SRS itself where, unlike a comb spectrum and a minimum transmission BW of 4 RBs that are applicable for SRS transmissions from a UE capable of transmitting SRS over the entire UL system BW (see also REF 1), SRS transmission from LC-UE 114 can have the same structure as a DMRS transmission in a PUSCH (see also REF 1) and the SRS transmission BW can be one RB. Additionally, eNB 102 can configure LC-UE 114 to transmit a DMRS in one RB without an associated PUSCH transmission. The DMRS can be multiplexed using different cyclic shifts and orthogonal covering codes (see also REF 1 and REF 2) with DMRS transmitted by other UEs in the same RB either with or without a respective PUSCH transmission. This can enable eNB 102 to obtain a more accurate SINR estimate, due to the larger number of SRS per SF, and improve UL spectral efficiency as additional resources for SRS transmissions are not required.

Figure 16:
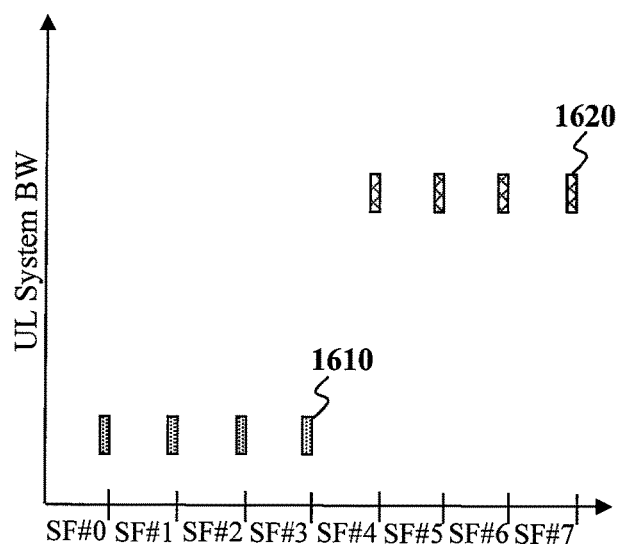
FIG. 16 illustrates a SRS transmission from a LC-UE using repetitions and frequency hopping in a set of sub-bands according to this disclosure.

FIG. 16 illustrates a SRS transmission from a LC-UE using repetitions and frequency hopping in a set of sub-bands according to this disclosure. The embodiment of the SRS transmission shown in FIG. 16 is for illustration only. Other embodiments could be used without departing from the scope of the present disclosure.

The eNB 102 configures LC-UE 114 to repeat a SRS transmission in $N_{SRS}$=4 SFs and in two sub-bands. LC-UE 114 transmits SRS in $N_{SRS}$=4 successive SFs in the first sub-band 1610 and subsequently in $N_{SRS}$=4 successive SFs in the second sub-band 1620. The configuration can be for a single burst of 8 SRS transmissions in the first sub-band and in the second sub-band or for periodic bursts of 8 SRS transmissions in the first sub-band and in the second sub-band.

As an alternative to eNB 102 configuring SRS transmission from LC-UE 114 to determine SINR estimates in a set of sub-bands, eNB 102 can obtain SINR estimates in the set of sub-bands from the DMRS that LC-UE 114 transmits in repetitions of a PUSCH transmission in the set of sub-bands. This alternative can avoid the additional UE power consumption associated with SRS transmissions.

The eNB 102 can configure LC-UE 114 to transmit a first number of repetitions for a PUSCH transmission over respective first number of SFs in each sub-band from a set of sub-bands. Equivalently, eNB 102 can configure a total number of repetitions that LC-UE 114 can equally divide among the sub-bands in the set of sub-bands to determine the first number of SFs. Each PUSCH repetition in each respective SF includes a number of DMRS symbols per SF such as 2 DMRS symbols (see also REF 1). The eNB 102 can combine, such as for example, coherently average, the DMRS symbols in the first number of SFs in each sub-band and obtain an SINR estimate for LC-UE 114 in each sub-band. As a function of the SINR estimate for each sub-band in the set of sub-bands, eNB 102 can subsequently configure LC-UE 114 to transmit a second number of repetitions for PUSCH transmission in a sub-set of sub-bands from the set of sub-bands, for example only in the sub-band where eNB 102 estimates a reception from LC-UE 114 as having the highest SINR. This can enable eNB 102 to configure a smaller number of repetitions for a PUSCH transmission from LC-UE 114 than when the total number of repetitions for a PUSCH transmission is distributed over all sub-bands in the set of sub-bands, thereby improving UL spectral efficiency and reducing UE power consumption. The eNB 102 can reconfigure LC-UE 114 to transmit repetitions for a PUSCH transmission in each sub-band from a same or a different set of sub-bands and repeat the above process. For example, a reconfiguration can be triggered by a decrease in the SINR of PUSCH receptions in a current sub-set of sub-bands.

FIG. 17A illustrates a process for an eNB to determine a sub-band to configure to a LC-UE for PUSCH transmission according to this disclosure. FIG. 17B illustrates sub-bands associated with the process for an eNB to determine a sub-band to configure to a LC-UE for PUSCH transmission according to this disclosure. While the flow chart in FIG. 17A depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by one or more processors in, for example, a base station.

An eNB, such as eNB 102, configures a LC-UE, such as LC-UE 114, to transmit a first number of repetitions (including one repetition) for a PUSCH transmission in each sub-band from a set of sub-bands in block 1710. Based on the received repetitions for the PUSCH transmission in each sub-band from the set of sub-bands, eNB 102 determines an SINR estimate for PUSCH receptions from LC-UE 114 in each respective sub-band from the set of sub-bands in block 1720. Based at least on the SINR estimates for the sub-bands from the set of sub-bands, eNB 102 then configures LC-UE 114 to transmit a second number of repetitions for a PUSCH in a sub-set of sub-band from the set of sub-bands wherein the sub-set of sub-bands can include only one sub-band in block 1730.

A sixth embodiment of the disclosure considers a LC-UE behavior when repetitions for respective transmissions of UCI and data overlap in time or when repetitions of respective transmissions of different UCI types overlap in time.

LC-UE 114 can multiplex UCI (HARQ-ACK or CSI) in a PUSCH transmission that is configured with a number of repetitions. When the PUSCH transmission is configured with repetitions, an MCS for data symbols is likely to be low and consequently a number of REs used for UCI multiplexing is likely to be large (see also REF 2). Therefore, as UCI typically requires a lower BLER than data information, a number of REs in the PUSCH that need to be allocated to UCI transmission can be large and can result to an unavailability of a sufficient number of REs for transmission of data symbols or to an inadequate number of REs for UCI multiplexing. For example, all 4 SF symbols next to the two RS symbols in a SF as in FIG. 4 can be used for HARQ-ACK multiplexing (see also REF 2) and instead of LC-UE 114 having 12 SF symbols available for data transmission (or 11 SF symbols when LC-UE 114 punctures PUSCH transmission in a last SF as discussed in FIG. 4—see also REF 2) when LC-UE 114 does not multiplex HARQ-ACK in the PUSCH, LC-UE 114 can have 8 SF symbols (or 7 SF symbols in case it punctures PUSCH transmission in the last SF symbol). A loss in available REs for data transmission further increases when LC-UE 114 multiplexes A-CSI in the PUSCH. As eNB 102 cannot always accommodate potentially large variations in a number of available REs for data transmission by reducing a data MCS, for example because a low MCS is already likely to be used as the PUSCH transmission is with repetitions, eNB 102 can configure LC-UE 114 to use a first number, or set of numbers, of repetitions when LC-UE 114 does not multiplex UCI in a PUSCH and to use a second number, or a second set of numbers, of repetitions when UE 114 multiplexes UCI in a PUSCH, where the second number is larger than the first number or a maximum number in the first set of numbers is larger than a maximum number in the second set of numbers. Alternatively, when MCS reduction is possible, eNB 102 can configure LC-UE 114 to use a first MCS when LC-UE does not multiplex UCI in a PUSCH and a second MCS when LC-UE 114 multiplexes UCI in a PUSCH, where the second MCS is smaller than the first MCS.

FIG. 18 illustrates a configuration of a number of repetitions for a PUSCH transmission according to whether or not UCI is multiplexed in the PUSCH according to the disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by one or more processors in, for example, a base station.

The eNB 102 configures LC-UE 114 with a first number of repetitions and with a second number of repetitions for a PUSCH transmission in block 1810. LC-UE 114 determines whether LC-UE 114 needs to multiplex UCI in the PUSCH in block 1820. When LC-UE 114 does not multiplex UCI in the PUSCH, LC-UE 114 transmits the PUSCH using the first number of repetitions in block 1830. When LC-UE 114 multiplexes UCI in the PUSCH, LC-UE 114 transmits the PUSCH using the second number of repetitions in block 1840, where the second number of repetitions is larger than the first number of repetitions.

Repetitions for a transmission of data information in a PUSCH and repetitions (including no repetitions) for a transmission of UCI in a PUCCH can partially overlap in time. For example, LC-UE 114 can have ongoing repetitions of a PUSCH transmission when LC-UE 114 needs to transmit UCI. Further, a number of remaining repetitions for the PUSCH transmission can be insufficient to ensure a target BLER for the UCI when the UCI is multiplexed in the remaining repetitions of the PUSCH transmission. Moreover, as a link budget for transmission of UCI is typically worse in a PUSCH than in a PUCCH, as typically fewer SF symbols are used for multiplexing UCI in the PUSCH (see also REF 3), then for a same UCI target BLER, a larger number of repetitions for a PUSCH transmission is required than a number of repetitions for a PUCCH transmission. To avoid such operational shortcomings, when LC-UE 114 needs to transmit UCI and LC-UE 114 also transmits a PUSCH with repetitions, LC-UE 114 can suspend repetitions of the PUSCH transmission, transmit UCI on a PUCCH, and once the repetitions of the PUCCH transmission complete, LC-UE 114 can resume with remaining repetitions, if any, of the PUSCH transmission. Therefore, when LC-UE 114 transmits a PUSCH with repetitions, LC-UE 114 does not multiplex UCI in the PUSCH even when LC-UE 114 is configured by RRC signaling to transmit the UCI in a PUCCH without repetitions.

Suspension of a PUSCH transmission can also depend on the UCI type that LC-UE needs to transmit in a PUCCH (instead of always suspending repetitions of a PUSCH transmission until repetitions of a PUCCH transmission complete). For example, when LC-UE 114 needs to transmit HARQ-ACK on a PUCCH, repetitions of a PUSCH transmission can be suspended while when LC-UE 114 needs to transmit P-CSI on a PUCCH, LC-UE 114 can drop the entire transmission of P-CSI. LC-UE 114 does not adjust a number of repetitions for a PUSCH transmission to accommodate for suspended repetitions; that is, suspended repetitions of a PUSCH transmission are lost. Conversely, when LC-UE 114 does not transmit PUSCH with repetitions, that is when LC-UE 114 transmits a PUSCH only in one SF, LC-UE 114 can multiplex UCI in the PUSCH instead of suspending the PUSCH transmission to transmit the UCI on a PUCCH.

Figure 19:
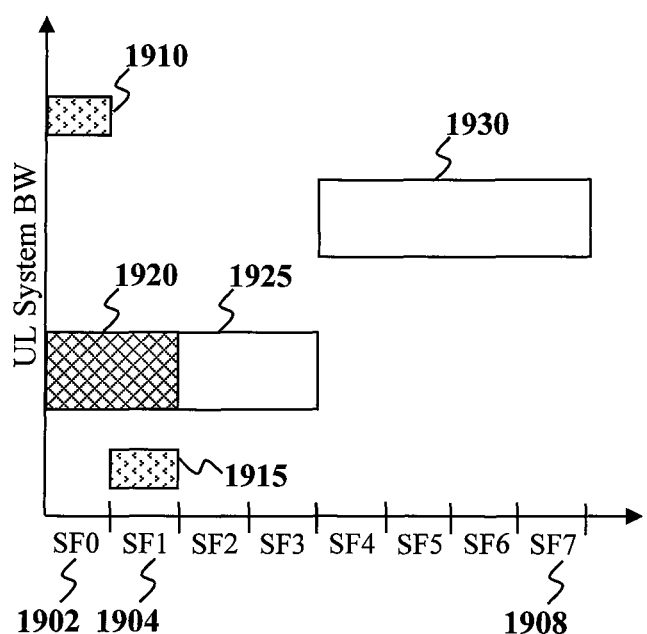
FIG. 19 illustrates a transmission with repetitions of a PUSCH and a transmission with repetitions of a PUCCH from LC-UE where the repetitions overlap in time according to the disclosure.

FIG. 19 illustrates a transmission with repetitions of a PUSCH and a transmission with repetitions of a PUCCH from LC-UE where the repetitions overlap in time according to the disclosure. The example shown in FIG. 19 is for illustration only. Other examples could be used without departing from the scope of the present disclosure.

In a first SF, SF0 1902, LC-UE 114 is configured to transmit UCI in a PUCCH and LC-UE 114 is also configured to transmit data in a PUSCH with eight repetitions starting in SF0 and ending in SF7 1908. LC-UE 114 transmits UCI in a first repetition 1910 of the PUCCH transmission in SF0 1902 and in a second repetition 1915 of the PUCCH transmission in SF1 1904. LC-UE 114 suspends repetitions 1920 of the PUSCH transmission in SF0 1902 and SF1 1904 and continues with the repetitions of the PUSCH transmission 1925 and 1930 in the remaining of the eight SFs. LC-UE 114 applies a similar process even when LC-UE 114 is configured to transmit UCI in the PUCCH only in SF0 1902 and in such case LC-UE 114 does not multiplex UCI on the PUSCH, despite the UCI being transmitted without repetitions in the PUCCH, and suspends only the repetition of the PUSCH transmission in SF0 1902.

A same approach can apply when repetitions for a transmission of HARQ-ACK information or of SR in a PUCCH and repetitions for a transmission of P-CSI in a PUCCH partially overlap in time and HARQ-ACK transmission or SR transmission is prioritized over P-CSI transmission. When repetitions for a transmission of HARQ-ACK information in a PUCCH and repetitions for a transmission of a SR in a PUCCH partially overlap in time, a system operation can specify that either the HARQ-ACK transmission or the SR transmission is prioritized. Alternatively, HARQ-ACK and SR can have a same priority and the earlier transmission can be prioritized, that is, HARQ-ACK is prioritized over SR when repetitions of a PUCCH transmission conveying HARQ-ACK start earlier than repetitions of a PUCCH transmission conveying SR. When repetitions of a PUCCH transmission conveying HARQ-ACK and repetitions of a PUCCH transmission conveying SR fully overlap in time, and assuming that LC-UE 114 is configured by RRC signaling a same number of repetitions for each respective PUCCH transmission, HARQ-ACK and SR can be multiplexed as in case of no repetitions. Alternatively, a default prioritization for either HARQ-ACK transmission or SR transmission can again apply.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with example embodiments, various changes and modifications can be suggested to one skilled in the art. It is intended that the present disclosure encompass such changes and modifications that fall within the scope of the appended claims.

What is claimed is:

1. A method for obtaining channel quality information (CQI), the method comprising:
   transmitting reference signals; and
   receiving a first CQI index and a second CQI index, wherein:
      the first CQI index and the second CQI index are determined from measurements of the reference signals,
      the first CQI index and the second CQI index are respectively mapped to a first SE value from a first set of spectral efficiency (SE) values and to a second SE value from a second set of SE values, and
      the first set of SE values includes smaller SE values than the second set of SE values and the second set of SE values includes larger SE values than the first set of SE values,
   wherein the first CQI index or the second CQI index is used for link adaptation of a first physical downlink channel (PDSCH) transmission or of a second PDSCH transmission, respectively.

2. The method of claim 1, wherein the second set of SE values includes SE values mapped to a larger modulation order than the modulation order for any SE value in the first set of SE values.

3. The method of claim 1, further comprising:
   transmitting an indication identifying at least one of the first CQI index or the second CQI index is associated with one of a predetermined set of CQI indexes.

4. The method of claim 1, further comprising:
   transmitting, in a downlink control information (DCI) format, an indication for a set of sub-bands, wherein the first CQI index or the second CQI index is determined based on measurements in the set of sub-bands.

5. The method of claim 1, further comprising:
   receiving a third CQI index, wherein:
      the third CQI index is an offset relative to the first CQI index,
      the first CQI index is determined from measurements of the reference signals over a first bandwidth,
      the third CQI index is determined from measurements of the reference signals over a third bandwidth,
      a physical downlink data channel (PDSCH) transmission is within the first bandwidth, and
      a physical downlink control channel (PDCCH) transmission is within the third bandwidth.

6. The method of claim 5, wherein the third bandwidth is a subset of the first bandwidth.

7. The method of claim 1, wherein:
   the first CQI index or the second CQI index is included in a physical uplink control channel (PUCCH),
   the PUCCH is received with repetitions,
   a repetition of the PUCCH overlaps in time with a reception of physical uplink shared channel (PUSCH) that includes only data information,
   the PUCCH and the PUSCH are from a same transmitter, and
   the reception of the PUSCH is dropped.

8. The method of claim 1, wherein:
   the first CQI index or the second CQI index is included in a first physical uplink control channel (PUCCH),
   the first PUCCH is received with repetitions,
   a reception of a repetition of the first PUCCH overlaps in time with a reception of a second PUCCH that includes acknowledgement information,
   the first PUCCH and the second PUCCH are from a same transmitter, and
   the reception of the repetition of the first PUCCH is dropped.

9. The method of claim 1, wherein:
   the first CQI index or the second CQI index is included in a first physical uplink control channel (PUCCH) and in a second PUCCH,
   the first PUCCH and the second PUCCH are received with repetitions,
   a first repetition of the second PUCCH is after a first repetition of the first PUCCH,
   a repetition of the first PUCCH overlaps in time with a repetition of the second PUCCH, and
   reception of the repetition of the second PUCCH is dropped.

10. A base station, comprising:
   a transmitter configured to transmit reference signals; and
   a receiver configured to receive:
      a first channel quality information (CQI) index and a second CQI index, wherein:
         the first CQI index and the second CQI index are determined from measurements of the reference signals,
         the first CQI index and the second CQI index are respectively mapped to a first SE value from a first set of spectral efficiency (SE) values and to a second SE value from a second set of SE values, and
         the first set of SE values includes smaller SE values than the second set of SE values and the second set of SE values includes larger SE values than the first set of SE values,
      wherein the first CQI index or the second CQI index is used for link adaptation of a first physical downlink channel (PDSCH) transmission or of a second PDSCH transmission, respectively.

11. The base station of claim 10, wherein the second set of SE values includes SE values mapped to a larger modulation order than the modulation order for any SE value in the first set of SE values.

12. The base station of claim 10, wherein the transmitter is configured to transmit an indication identifying at least one of the first CQI index or the second CQI index is associated with one of a predetermined set of CQI indexes.

13. The base station of claim 10, wherein the transmitter is configured to transmit, in a downlink control information (DCI) format, an indication for a set of sub-bands, wherein the first CQI index or the second CQI index is determined based on measurements in the set of sub-bands.

14. The base station of claim 10, wherein the receiver is configured to receive a third CQI index, wherein:
the third CQI index is an offset relative to the first CQI index,
the first CQI index is determined from measurements of the reference signals over a first bandwidth,
the third CQI index is determined from measurements of the reference signals over a third bandwidth,
a physical downlink data channel (PDSCH) transmission is within the first bandwidth, and
a physical downlink control channel (PDCCH) transmission is within the third bandwidth.

15. The base station of claim 14, wherein the third bandwidth is a subset of the first bandwidth.

16. The base station of claim 10, wherein the receiver is configured to receive a physical uplink control channel (PUCCH) that includes the first CQI index or the second CQI index, wherein:
the PUCCH is received with repetitions,
a repetition of the PUCCH overlaps in time with a reception of physical uplink shared channel (PUSCH) that includes only data information,
the PUCCH and the PUSCH are from a same transmitter, and
the reception of the PUSCH is dropped.

17. The base station of claim 10, wherein the receiver is configured to receive a first physical uplink control channel (PUCCH) that includes the first CQI index or the second CQI index, wherein:
the first PUCCH is received with repetitions,
a reception of a repetition of the first PUCCH overlaps in time with a reception of a second PUCCH that includes acknowledgement information,
the first PUCCH and the second PUCCH are from a same transmitter, and
the reception of the repetition of the first PUCCH is dropped.

18. The base station of claim 10, wherein the receiver is configured to receive a first physical uplink control channel (PUCCH) and a second PUCCH that include the first CQI index or the second CQI index, wherein:
the first PUCCH and the second PUCCH are received with repetitions,
a first repetition of the second PUCCH is after a first repetition of the first PUCCH,
a repetition of the first PUCCH overlaps in time with a repetition of the second PUCCH, and
reception of the repetition of the second PUCCH is dropped.

* * * * *